United States Patent
Ogura et al.

(10) Patent No.: US 12,395,734 B2
(45) Date of Patent: Aug. 19, 2025

(54) IMAGE CAPTURE APPARATUS AND CONTROL METHOD THEREOF

(71) Applicant: CANON KABUSHIKI KAISHA, Tokyo (JP)

(72) Inventors: Hideki Ogura, Kanagawa (JP); Akihiko Kanda, Kanagawa (JP); Hiroshi Yashima, Kanagawa (JP); Hideyuki Hamano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 350 days.

(21) Appl. No.: 18/159,741

(22) Filed: Jan. 26, 2023

(65) Prior Publication Data

US 2023/0247290 A1    Aug. 3, 2023

(30) Foreign Application Priority Data

Feb. 3, 2022    (JP) ................................. 2022-015819

(51) Int. Cl.
| | |
|---|---|
| H04N 23/67 | (2023.01) |
| G06T 7/20 | (2017.01) |
| G06V 10/25 | (2022.01) |
| G06V 10/74 | (2022.01) |

(52) U.S. Cl.
CPC ............. *H04N 23/675* (2023.01); *G06T 7/20* (2013.01); *G06V 10/25* (2022.01); *G06V 10/761* (2022.01); *G06T 2207/10148* (2013.01)

(58) Field of Classification Search
CPC .................................................. H04N 23/675
See application file for complete search history.

(56) References Cited

U.S. PATENT DOCUMENTS

| | | | | |
|---|---|---|---|---|
| 2007/0047941 A1* | 3/2007 | Iwane | .................. | H04N 23/611 348/E5.045 |
| 2008/0068487 A1* | 3/2008 | Morita | ................... | H04N 23/61 345/428 |
| 2009/0009651 A1* | 1/2009 | Takayanagi | .......... | H04N 23/673 396/89 |
| 2009/0095880 A1* | 4/2009 | Otsuki | ..................... | G02B 7/36 250/201.2 |
| 2009/0262230 A1* | 10/2009 | Sugiura | .................. | H04N 5/145 348/E5.022 |
| 2010/0097484 A1* | 4/2010 | Yata | ....................... | H04N 23/61 348/222.1 |

(Continued)

FOREIGN PATENT DOCUMENTS

| | | | | |
|---|---|---|---|---|
| JP | 2009-284462 A | | 12/2009 | |
| JP | 2010072284 A | * | 4/2010 | ............... G02B 7/11 |

OTHER PUBLICATIONS

Suzuki et al.; JP-2010072284-A; Focusing Unit for Camera; English Translation; Apr. 2, 2010; pp. 1-9 (Year: 2010).*

*Primary Examiner* — Cynthia Segura
(74) *Attorney, Agent, or Firm* — Cowan, Liebowitz & Latman, P.C.

(57) ABSTRACT

An image capture apparatus detects a subject area from an image that has been shot and enlarges a focus detection area in a case where the subject area is not detected or a reliability that the detected subject area corresponds to an intended subject is determined to be low. The image capture apparatus enlarges the focus detection area based on the distances previously obtained by the obtainment unit.

10 Claims, 26 Drawing Sheets

(56) References Cited

U.S. PATENT DOCUMENTS

| | | | |
|---|---|---|---|
| 2010/0289937 A1* | 11/2010 | Hada | H04N 23/635 348/E5.022 |
| 2013/0002884 A1* | 1/2013 | Nakagawara | H04N 23/635 348/169 |
| 2014/0139724 A1* | 5/2014 | Yasuda | H04N 23/635 348/349 |
| 2020/0099853 A1* | 3/2020 | Sanno | H04N 23/675 |
| 2021/0203856 A1* | 7/2021 | Hirose | H04N 23/611 |
| 2023/0370714 A1* | 11/2023 | Sanno | H04N 23/632 |

* cited by examiner

PLAN VIEW a-a CROSS-SECTIONAL VIEW

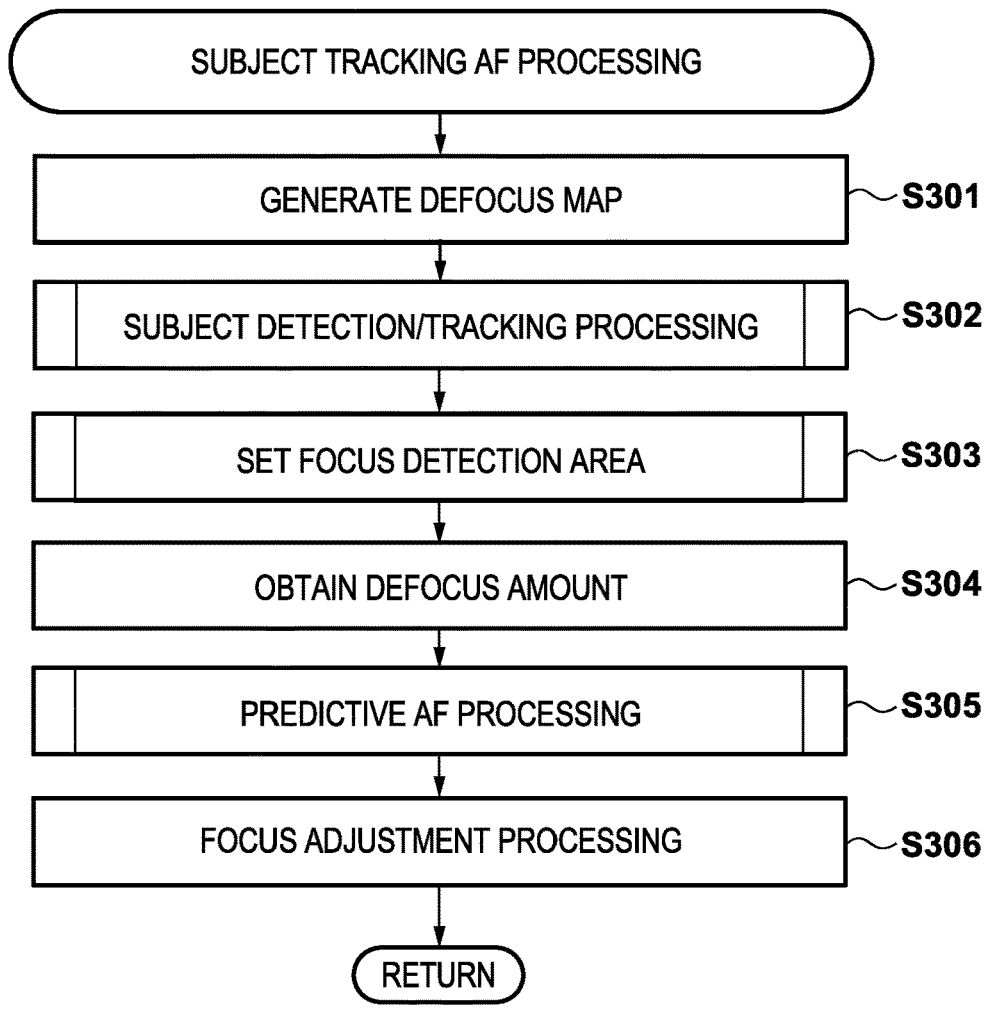
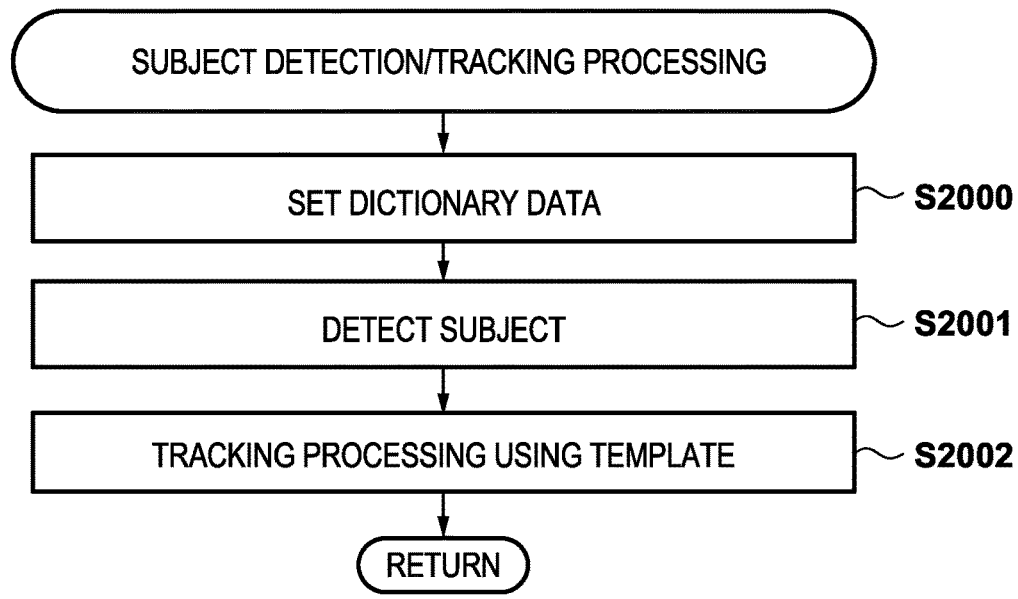

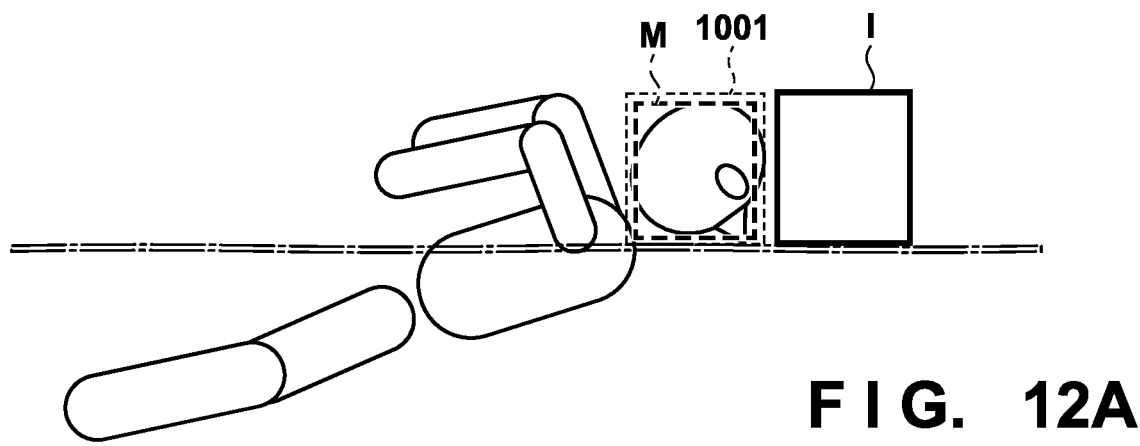
F I G. 12A
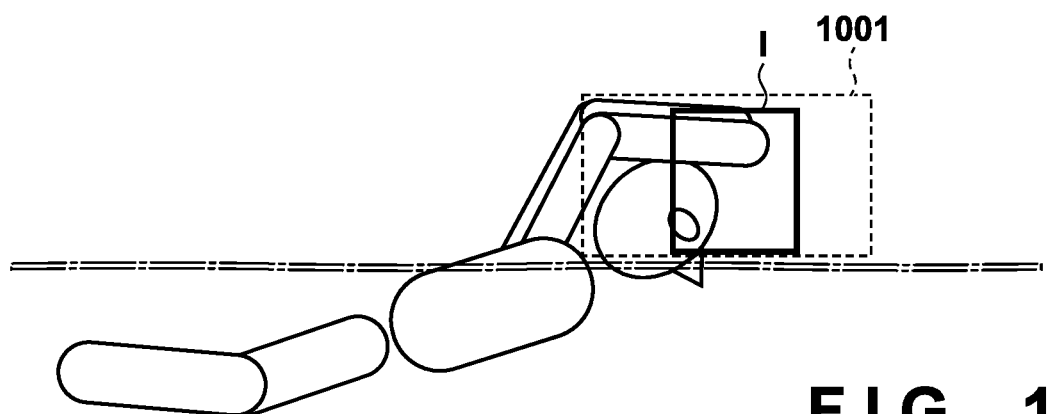
F I G. 12B
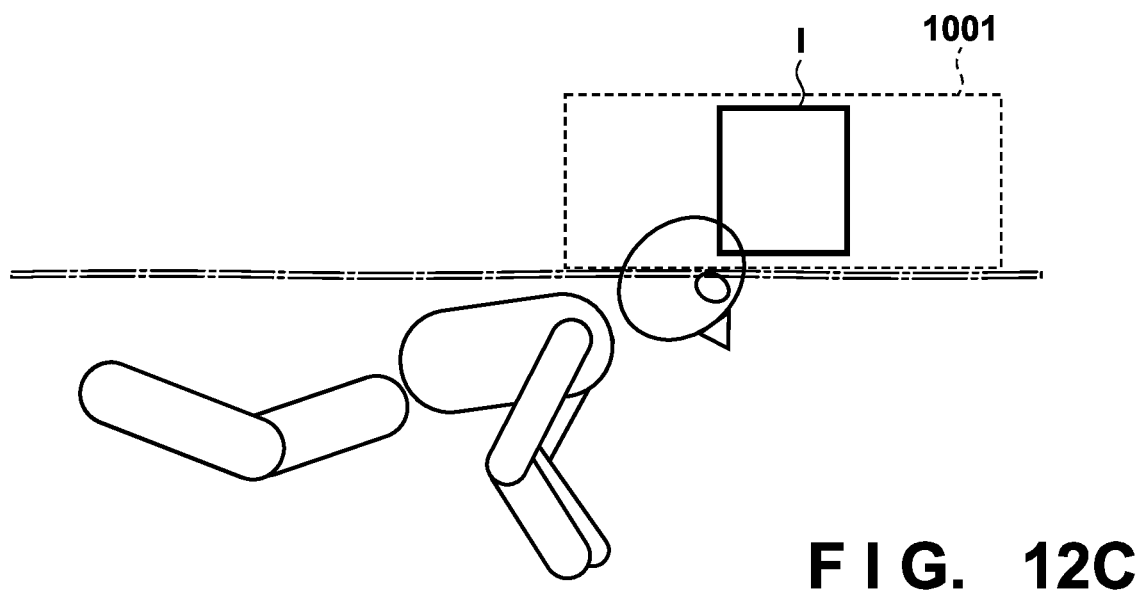
F I G. 12C

F I G. 16

| | MAGNITUDE OF DISTANCE | FRAMING AMOUNT | FOCUS DETECTION AREA RANGE |
|---|---|---|---|
| SETTING 1 | HIGH | LARGE | A |
| SETTING 2 | LOW | LARGE | B |
| SETTING 3 | HIGH | SMALL | C |
| SETTING 4 | LOW | SMALL | D |

IMAGE CAPTURE APPARATUS AND CONTROL METHOD THEREOF

BACKGROUND OF THE INVENTION

Field of the Invention

The present invention relates to an image capture apparatus and a control method thereof, and particularly relates to automatic focus detection (AF) techniques.

Description of the Related Art

A subject tracking function is known in which focus detection that tracks the motion of a specific subject is realized by continuously detecting a subject area and setting a focus detection area to the detected subject area (Japanese Patent Laid-Open No. 2009-284462).

It becomes difficult to continue the subject tracking function when the target subject area is no longer detected. For example, in a swimming scene, the subject tracking function for the face of a swimmer may not work well because the swimmer's head moves in and out of the water, the face is hidden by the hands, and so on.

If the subject tracking function cannot be used, it is necessary to shoot images while changing the shooting range of the camera to follow the motion of the subject such that the area to be focused on (the swimmer's face, in the above example) is located within the focus detection area. This is an operation similar to a panning shot, and is not easy.

SUMMARY OF THE INVENTION

The present invention in one aspect provides an image capture apparatus and a control method thereof capable of providing a function that assists in shooting moving subjects for which continuous detection is difficult.

According to an aspect of the present invention, there is provided an image capture apparatus comprising one or more processors that execute a program stored in a memory and thereby function as: a detection unit configured to detect a subject area from an image that has been shot; an obtainment unit configured to obtain a distance in the image between a focus detection area that is set and the subject area detected; and an enlargement unit configured to enlarge the focus detection area in a case where the subject area is not detected or a reliability that the detected subject area corresponds to an intended subject is determined to be low, wherein the enlargement unit enlarges the focus detection area based on the distances previously obtained by the obtainment unit.

According to another aspect of the present invention, there is provided an image capture apparatus comprising one or more processors that execute a program stored in a memory and thereby function as: a motion detection unit configured to detect motion of the image capture apparatus; a determination unit configured to determine whether the image capture apparatus is undergoing a framing action based on the motion of the image capture apparatus; and an enlargement unit configured to enlarge a focus detection area based on the motion of the image capture apparatus in a case where the determination unit determines that the image capture apparatus is undergoing a framing action.

According to a further aspect of the present invention, there is provided a control method executed by an image capture apparatus, the control method comprising: detecting a subject area from an image that has been shot; obtaining a distance between a focus detection area that is set and the subject area detected; and enlarging the focus detection area in a case where the subject area is not detected or a reliability that the detected subject area corresponds to an intended subject is determined to be low, wherein in the enlarging, the focus detection area is enlarged based on the distances previously obtained.

According to another aspect of the present invention, there is provided a control method executed by an image capture apparatus, the control method comprising: detecting motion of the image capture apparatus; determining whether the image capture apparatus is undergoing a framing action based on the motion of the image capture apparatus; and enlarging a focus detection area based on the motion of the image capture apparatus in a case where the image capture apparatus is determined to be undergoing a framing action.

According to a further aspect of the present invention, there is provided a non-transitory machine-readable medium that stores a program for causing a computer of an image capture apparatus to function as: a detection unit configured to detect a subject area from an image that has been shot; an obtainment unit configured to obtain a distance in the image between a focus detection area that is set and the subject area detected; and an enlargement unit configured to enlarge the focus detection area in a case where the subject area is not detected or a reliability that the detected subject area corresponds to an intended subject is determined to be low, wherein the enlargement unit enlarges the focus detection area based on the distances previously obtained by the obtainment unit.

According to another aspect of the present invention, there is provided a non-transitory machine-readable medium that stores a program for causing a computer of an image capture apparatus to function as: a motion detection unit configured to detect motion of the image capture apparatus; a determination unit configured to determine whether the image capture apparatus is undergoing a framing action based on the motion of the image capture apparatus; and an enlargement unit configured to enlarge a focus detection area based on the motion of the image capture apparatus in a case where the determination unit determines that the image capture apparatus is undergoing a framing action.

Further features of the present invention will become apparent from the following description of exemplary embodiments (with reference to the attached drawings).

BRIEF DESCRIPTION OF THE DRAWINGS

FIG. 9 is a flowchart pertaining to subject tracking AF processing according to an embodiment.

FIG. 10 is a flowchart pertaining to subject detection/tracking processing according to an embodiment.

FIGS. 12A to 12C are diagrams illustrating a method for setting a focus detection area according to the first embodiment.

FIG. 16 is a chart showing settings for a focus detection area according to the first embodiment.

DESCRIPTION OF THE EMBODIMENTS

Figure 1:
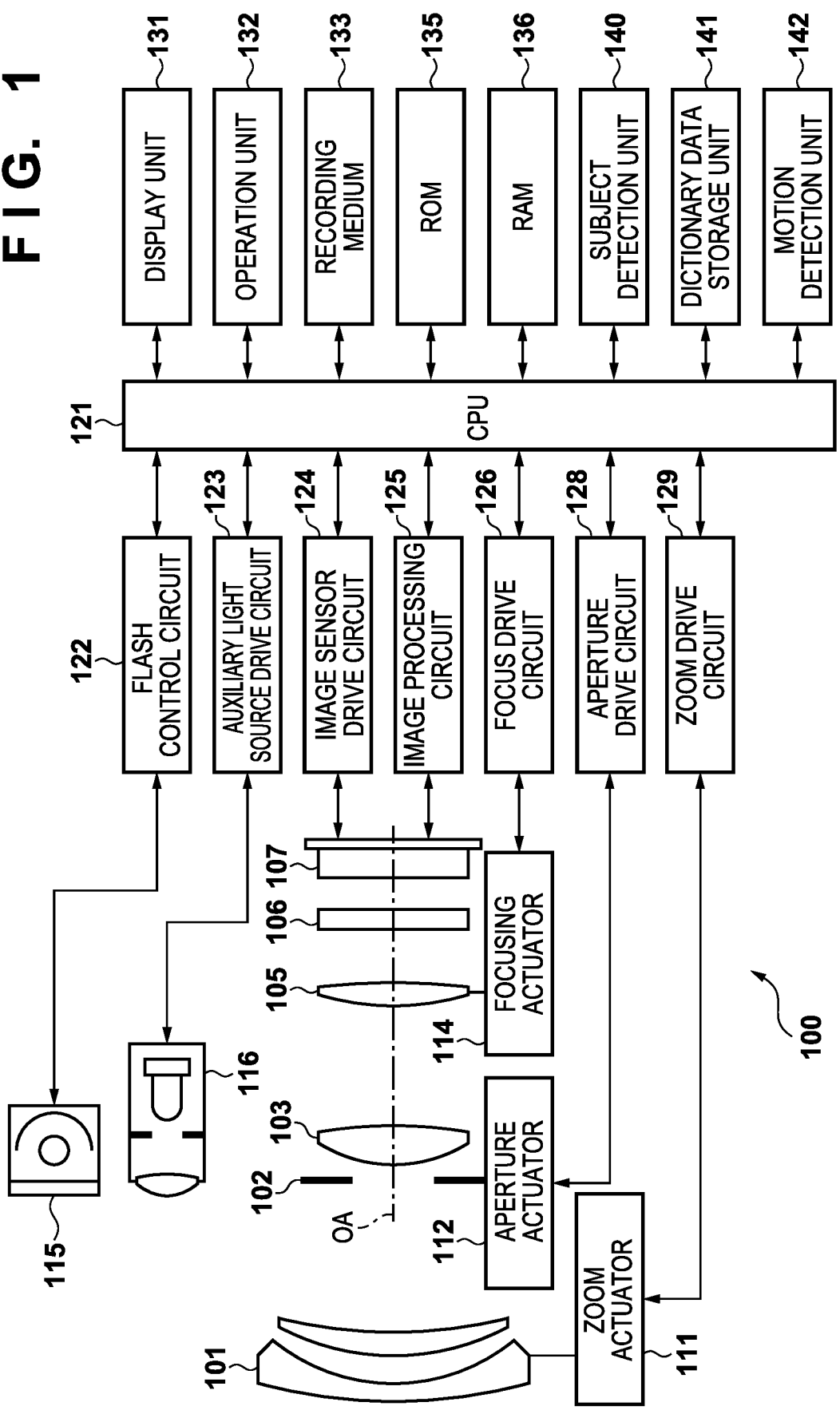
FIG. 1 is a block diagram illustrating an example of the functional configuration of a digital camera serving as an example of an image processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiments will describe a case where the present invention is applied in an image capture apparatus such as a digital camera. However, an image capture function is not essential to the present invention, and the present invention can be implemented in any electronic device. Examples of such an electronic device include computer devices (personal computers, tablet computers, media players, PDAs, and the like), mobile phones, smartphones, game consoles, robots, drones, and dashboard cameras. These are merely examples, however, and the present invention can be applied in other electronic devices as well.

Overall Configuration

FIG. 1 is a block diagram illustrating an example of the functional configuration of a digital camera 100 serving as an example of an image processing apparatus according to the present embodiment. The digital camera 100 (called simply a "camera 100" hereinafter) has an image capturing optical system which includes a first lens group 101, an aperture stop 102, a second lens group 103, and a third lens group 105, and which forms an optical image of a subject on an image capturing plane of an image sensor 107.

The first lens group 101 is located closest to the front (the subject side) of the plurality of lens groups included in the image capturing optical system, and can move along an optical axis OA. The position of the first lens group 101 is controlled by a zoom actuator 111. The zoom actuator 111 moves the first lens group 101 and the second lens group 103 in tandem in the optical axis direction by driving a cam cylinder (not shown), for example.

The aperture stop 102 has an aperture amount which can be adjusted by an aperture actuator 112, and functions as a mechanical shutter when capturing still images. Note that a mechanical shutter separate from the aperture stop 102 and a shutter actuator that drives the mechanical shutter may be provided.

The second lens group 103 moves integrally with the aperture stop 102, as well as in tandem with the first lens group 101 along the optical axis OA. The angle of view of the image capturing optical system (the focal length) is determined according to the positions of the first lens group 101 and the second lens group 103.

The third lens group 105 is capable of moving along the optical axis OA. The position of the third lens group 105 is controlled by a focus actuator 114. The focal length of the image capturing optical system is determined by the position of the third lens group. The third lens group is called a focus lens.

An optical low-pass filter 106 is provided to reduce false colors, moiré, and the like in captured images.

The image sensor 107 is, for example, a CMOS image sensor or CCD sensor image sensor having a rectangular pixel array (also called a "pixel area") constituted by m pixels in the horizontal direction and n pixels in the vertical direction, arranged two-dimensionally. Each pixel is provided with a color filter based on the primary color Bayer array and an on-chip microlens, for example. Note that the image sensor 107 may be a three-plate color image sensor.

Note that in the present embodiment, the image capturing optical system, the zoom actuator 111, the aperture actuator 112, the focus actuator 114, a focus drive circuit 126, an aperture drive circuit 128, and a zoom drive circuit 129 are provided in the camera 100. However, these constituent elements may be provided in a lens unit which can be attached to and removed from the camera 100.

A flash 115 is a light source that illuminates the subject. The flash 115 includes a flash emission device that uses a xenon tube, or a light-emitting diode (LED) that emits continuous light. An automatic focus detection (AF) auxiliary light source 116 projects a predetermined pattern image through a projection lens. This improves the focus detection performance for low-luminance or low-contrast subjects.

A CPU 121 controls the operation of the image capture apparatus 100 as a whole. The CPU 121 includes an A/D converter, a D/A converter, a communication interface circuit, and the like. By loading a program stored in a ROM 135 into a RAM 136 and executing the program, the CPU 121 controls each part of the image capture apparatus 100 and realizes the functions of the image capture apparatus 100, such as automatic focus detection, image capturing, image processing, recording, and the like. Some of the functions realized by the CPU 121 by executing programs may be implemented by hardware circuits separate from the CPU 121. Reconfigurable circuits such as FPGAs may be used for some of the circuits as well. For example, some calculations may be performed by a dedicated hardware circuit to reduce the time required for the calculations for focus detection (described later).

The communication interface circuit included in the CPU 121 supports one or more standards for wired and wireless communication. The image capture apparatus 100 can communicate with external devices directly or via other devices through the communication interface circuit.

A flash control circuit 122 controls the lighting of the flash 115 in synchronization with image capture operation. An auxiliary light source drive circuit 123 controls the lighting of the AF auxiliary light source 116 in synchronization with focus detection processing. An image sensor drive circuit 124 controls the image capture operation by the image sensor 107, as well as performing A/D conversion on signals obtained from the image capture operation and transmitting those image signals to the CPU 121.

An image processing circuit 125 can apply various types of image processing to image data, such as gamma conversion, color interpolation, encoding, decoding, evaluation value generation, detection of feature areas, and the like. Additionally, the image processing circuit 125 obtains posture information of a subject for each subject area detected by a subject detection unit 140 (described later).

The posture information to be obtained by the image processing circuit 125 is assumed to be determined in advance according to the type of the subject. For example, when the subject is a human, the image processing circuit 125 is assumed to obtain the positions of a plurality of joints as the posture information of the subject. The image processing circuit 125 detects the positions of the top of the head, the neck, the shoulders, the elbows, the wrists, the hips, the knees, and the ankles as the positions of the joints, for example. However, the joint positions detected by the image processing circuit 125 may be only some of these, and other joint positions may be detected as well. In addition to the joint positions, information such as axes connecting joints to each other, the position of the center of gravity of the subject, and the like may be detected as the posture information. The image processing circuit 125 can detect any information on the posture of the subject as the posture information.

The image processing circuit 125 determines a main subject using position information on a detected feature area and the obtained posture information on the subject. The image processing circuit 125 may use a result of determining the main subject in other image processing (e.g., white balance adjustment processing). The image processing circuit 125 stores image data in the RAM 136 in association with the posture information on the subject detected from the image data, the position, size and the like of the feature area, position information on the center of gravity, the face, the pupils, and the like of the subject determined to be the main subject, and the like.

The focus drive circuit 126 drives the focus actuator 114 based on commands, which include drive amounts and drive directions of the focus lens, supplied from the CPU 121. As a result, the third lens group 105 moves along the optical axis OA, and the focal length of the image capturing optical system changes.

The aperture drive circuit 128 controls the diameter, and the opening and closing, of the aperture stop 102 by driving the aperture actuator 112. The zoom drive circuit 129 changes the focal length (angle of view) of the image capturing optical system by, for example, driving the zoom actuator 111 in response to a user instruction and moving the first lens group 101 and the second lens group 103 along the optical axis OA.

A display unit 131 includes, for example, a liquid crystal display device (LCD). The display unit 131 displays information pertaining to the image capture mode of the image capture apparatus 100, a preview image before an image is captured, a confirmation image after an image is captured, an indicator of the focus detection area (sometimes also referred to as an AF frame), a focus state display image during focus detection, or the like.

An operation unit 132 is constituted by a power switch, a release switch, a zoom operation switch, an image capture mode selection switch, and the like. The release switch includes two switches, namely SW1, which turns on when depressed halfway, and SW2, which turns on when fully depressed. A recording medium 133 is, for example, a semiconductor memory card that can be attached to and removed from the image capture apparatus 100, and still image data and moving image data obtained from capturing are recorded into the recording medium 133.

Note that if the display unit 131 is a touch screen, a touch panel, a combination of a touch panel and a GUI displayed in the display unit 131, or the like may be used as the operation unit 132. For example, the configuration can be such that when a tap operation on the touch panel is detected during a live view display, focus detection is performed using an image area corresponding to the tapped position as the focus detection area.

Note that contrast information of captured image data can also be calculated by the image processing circuit 125, with the CPU 121 executing contrast AF. In contrast AF, the contrast information is calculated sequentially while moving the focus lens group 105 and changing the focal length of the image capturing optical system, and the focus lens position where the contrast information peaks is set as the in-focus position.

In this manner, the image capture apparatus 100 can perform both image plane-based phase-detection AF and contrast AF, and one of these can be used selectively, or both in combination, according to the situation.

The subject detection unit 140 can be configured using a convolutional neural network (CNN), for example. By configuring a CNN using parameters generated through machine learning (dictionary data), an area of a specific subject present within an image expressed by image data can be detected. The subject detection unit 140 may be implemented using dedicated hardware configured to be capable of executing operation of processing using a CNN at high speeds, such as a graphics processing unit (GPU), a neural processing unit (NPU), or the like.

The machine learning for generating the dictionary data can be implemented using any publicly-known method, such as supervised learning or the like. Specifically, the CNN can be trained using a data set that associates input images with whether a target subject is present in the image, for each of subject types. The trained CNN or the parameters thereof can be stored in a dictionary data storage unit 141 as the dictionary data. Note that the training of the CNN may be performed by a device different from the camera 100. When a trained CNN is to be used for subject detection processing on a captured image, an image of the same size as the input images used when training the CNN is cut out from the captured image and input to the CNN. The area where a target subject appears can be estimated by inputting the cutout position to the CNN while sequentially changing that cutout position.

Note that the subject area may be detected using another method, such as detecting an object area in the image and then using feature quantities for each type of subject to determine which type of subject the object area is. The configuration of the neural network, the learning method, and the like can be changed according to the detection method which is used.

The subject detection unit 140 can be implemented through any publicly-known method as long as the number, position, size, and reliability of an area estimated to contain a pre-set type of subject can be output with respect to an input image.

By repeatedly applying subject detection processing while switching the dictionary data, the subject detection unit 140 can apply subject detection processing for a plurality of types of subjects to one frame's worth of image data. The CPU 121 can determine the dictionary data to be used in the subject detection processing from among a plurality of instances of dictionary data stored in the dictionary data storage unit 141, based on priority levels set in advance for the subject types, setting values of the camera 100, and the like.

The type of the subject may be, for example, a part of the human body, organs of the human body (the face, the pupils, the torso, or the like), or subjects aside from humans (animals, inanimate objects (tools, vehicles, buildings, and the like)), and so on, but is not limited thereto. Separate dictionary data is prepared for subjects having different features.

Dictionary data for detecting a human body may be prepared separately as dictionary data for detecting the human body (contours) and dictionary data for detecting the organs of the human body. The dictionary data for detecting the organs of the human body may be prepared individually for each type of organ.

A motion detection unit 142 is a sensor that detects, for example, an angular velocity around each of x, y, and z axes, and acceleration in the x, y, and z axis directions. The CPU 121 can detect motion of the camera 100 based on the output of the motion detection unit 142. The detected motion includes motion intended by the photographer, as with framing, and motion not intended by the photographer, as with camera shake. Here, "framing" is an operation that moves the shooting range in a certain direction without changing the angle of view of the camera 100, including panning and/or tilting. The CPU 121 uses the detected motion of the camera 100 for image stabilization, setting the focus detection area (described later), and the like.

Image Sensor

The pixel array and pixel structure of the image sensor 107 will be described with reference to FIGS. 2 to 3B. The left-right direction in FIG. 2 corresponds to an x direction (a horizontal direction); the up-down direction, to a y direction (a vertical direction); and a direction orthogonal to the x and y directions (perpendicular to the paper), to a z direction (an optical axis direction). The example illustrated in FIG. 2 illustrates the pixel (unit pixel) array of the image sensor 107 in a range of four columns by four rows, and a sub-pixel array in a range of eight columns by four rows.

A two-column by two-row pixel group 200, for example, has a pixel 200R having spectral sensitivity to a first color red (R) in an upper-left position, a pixel 200G having spectral sensitivity to a second color green (G) in upper-right and lower-left positions, and a pixel 200B having spectral sensitivity to a third color blue (B) in a lower-right position. Furthermore, each pixel (unit pixel) is divided into two parts in the x direction (Nx divisions) and one part in the y direction (Ny divisions) (a division number $N_{LF}=Nx \times Ny$), and is therefore constituted by a plurality of sub-pixels, namely a first sub-pixel 201 and a second sub-pixel 202 (from a first sub-pixel to an $N_{LF}$-th sub-pixel).

Figure 2:
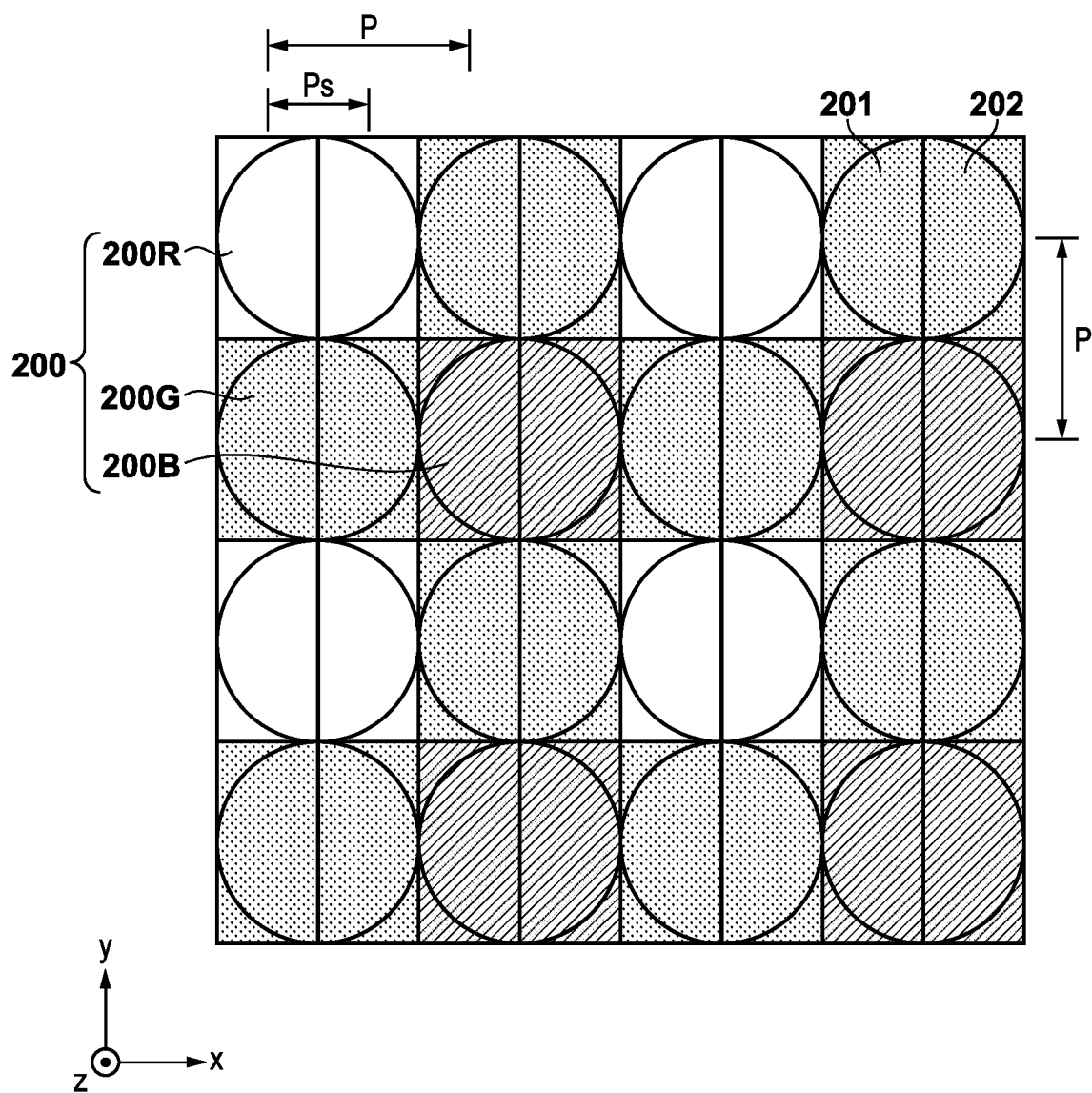
FIG. 2 is a diagram schematically illustrating a pixel array according to an embodiment.

In the example illustrated in FIG. 2, by dividing each pixel of the image sensor 107 into two sub-pixels aligned in the horizontal direction, it is possible to generate a number of viewpoint images equal to the division number $N_{LF}$ and a captured image that is a composite of all the viewpoint images from an image signal obtained from a single capture. Note that the pixels may be divided in two directions, and the number of divisions per direction is not limited. As such, it can be said that the viewpoint images are images generated from the signals of some of the plurality of sub-pixels, and the captured image is an image generated from the signals of all the sub-pixels. In the present embodiment, as an example, a pixel period P of the image sensor 107 in the horizontal and vertical directions is 6 μm, a horizontal pixel number $N_H=6000$, and a vertical pixel number $N_V=4000$. A total pixel number N is therefore $N_H \times N_V=24$ million. If a horizontal period $P_S$ of the sub-pixels is 3 μm, a total sub-pixel number $N_S=N_H \times (P/P_S) \times N_V=48$ million.

Figure 3A:
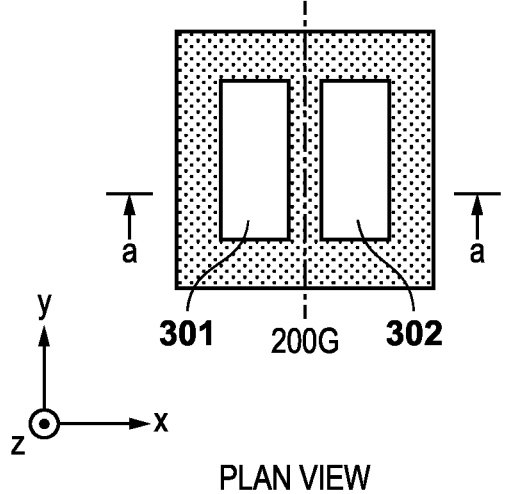
FIGS. 3A and 3B are a schematic plan view and a schematic cross-sectional view of a pixel according to an embodiment.

FIG. 3A is a plan view of one pixel 200G of the image sensor 107 illustrated in FIG. 2, viewed from a light receiving surface-side (+z side) of the image sensor 107. The z axis is set in the direction perpendicular to the paper surface in FIG. 3A, and the front side is defined as the positive direction in the z axis. Additionally, the y axis is set in the up-down direction orthogonal to the z axis, and "upward" is defined as the positive direction in the y axis; and the x axis is set in the left-right direction orthogonal to the z axis and y axis, and "rightward" is defined as the positive direction of the x axis. FIG. 3B is a cross-sectional view taken from the −y side along an a-a cut line in FIG. 3A.

Figure 3B:
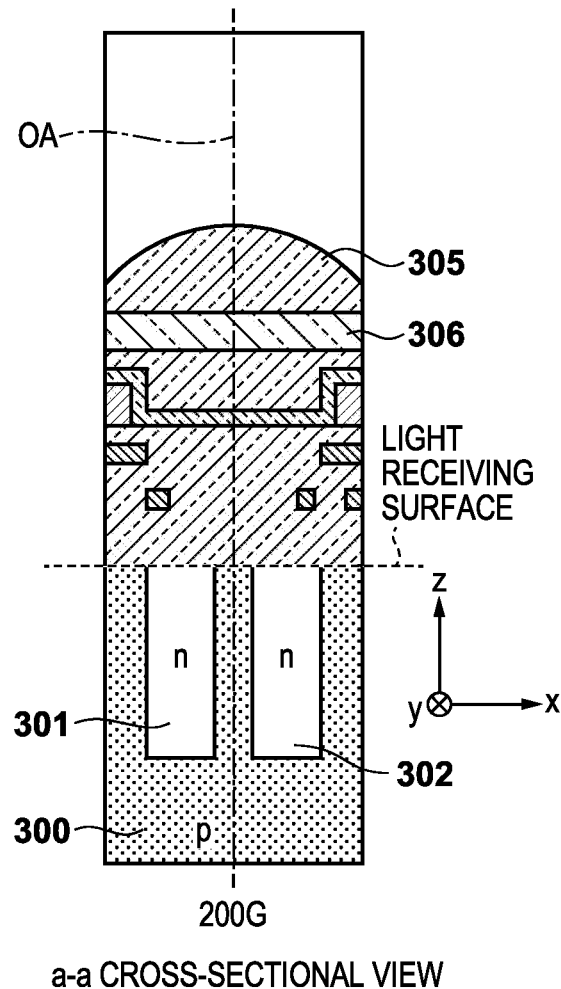

As illustrated in FIGS. 3A and 3B, microlenses 305 are formed on the light receiving surface-side (the +z direction) of each pixel 200G, and incident light is focused by the microlenses 305. Furthermore, a plurality of photoelectric conversion units having two divisions are formed, with two divisions in the x (horizontal) direction and one division in the y (vertical) direction, for a first photoelectric conversion unit 301 and a second photoelectric conversion unit 302. The first photoelectric conversion unit 301 and the second photoelectric conversion unit 302 correspond to the first sub-pixel 201 and the second sub-pixel 202, respectively, in FIG. 2. Described more generally, when the photoelectric conversion unit of each pixel is divided into Nx divisions in the x direction and Ny divisions in the y direction, and the division number $N_{LF}$ of the photoelectric conversion unit is $N_{LF}=Nx \times Ny$, first to $N_{LF}$-th photoelectric conversion units correspond to the first to $N_{LF}$-th sub-pixels.

The first photoelectric conversion unit 301 and the second photoelectric conversion unit 302 are two independent pn junction photodiodes, constituted by a p-type well layer 300 and two divided n-type layers 301 and 302. If necessary, the units may surround an intrinsic layer and be formed as a pin structure photodiode. In each pixel, a color filter 306 is formed between the microlens 305, and the first photoelectric conversion unit 301 and second photoelectric conversion unit 302. If necessary, the spectral transmittance of the color filter 306 may be changed for each pixel or each photoelectric conversion unit, or the color filter may be omitted.

The light incident on the pixel 200G is focused by the microlens 305, further spectrally divided by the color filter 306, and then received by the first photoelectric conversion unit 301 and the second photoelectric conversion unit 302, respectively. In the first photoelectric conversion unit 301 and the second photoelectric conversion unit 302, electrons and holes are produced in pairs according to the amount of light received, and electrons are stored after being separated by a barrier layer. On the other hand, the holes are discharged to the exterior of the image sensor 107 through a p-type well layer connected to a constant voltage source (not shown). The electrons accumulated in the first photoelectric conversion unit 301 and the second photoelectric conversion unit 302 are transferred to an electrostatic capacitance unit (FD) via a transfer gate and converted into voltage signals.

Note that in the present embodiment, the microlenses 305 correspond to an optical system in the image sensor 107. The optical system in the image sensor 107 may be configured to use microlenses as in the present embodiment, or may be configured to use a material having a different refractive index, such as a waveguide or the like. Additionally, the image sensor 107 may be a backside-illuminated image sensor having circuits and the like on the surface opposite the surface having the microlenses 305, or may be a stacked image sensor including some circuits such as the image sensor drive circuit 124, the image processing circuit 125, and the like. Materials other than silicon may be used as the semiconductor substrate, and for example, an organic material may be used as the photoelectric conversion material.

Pupil Division

A pupil division function of the image sensor 107 according to the present embodiment will be described next with reference to FIGS. 4 and 5A.

Figure 4:
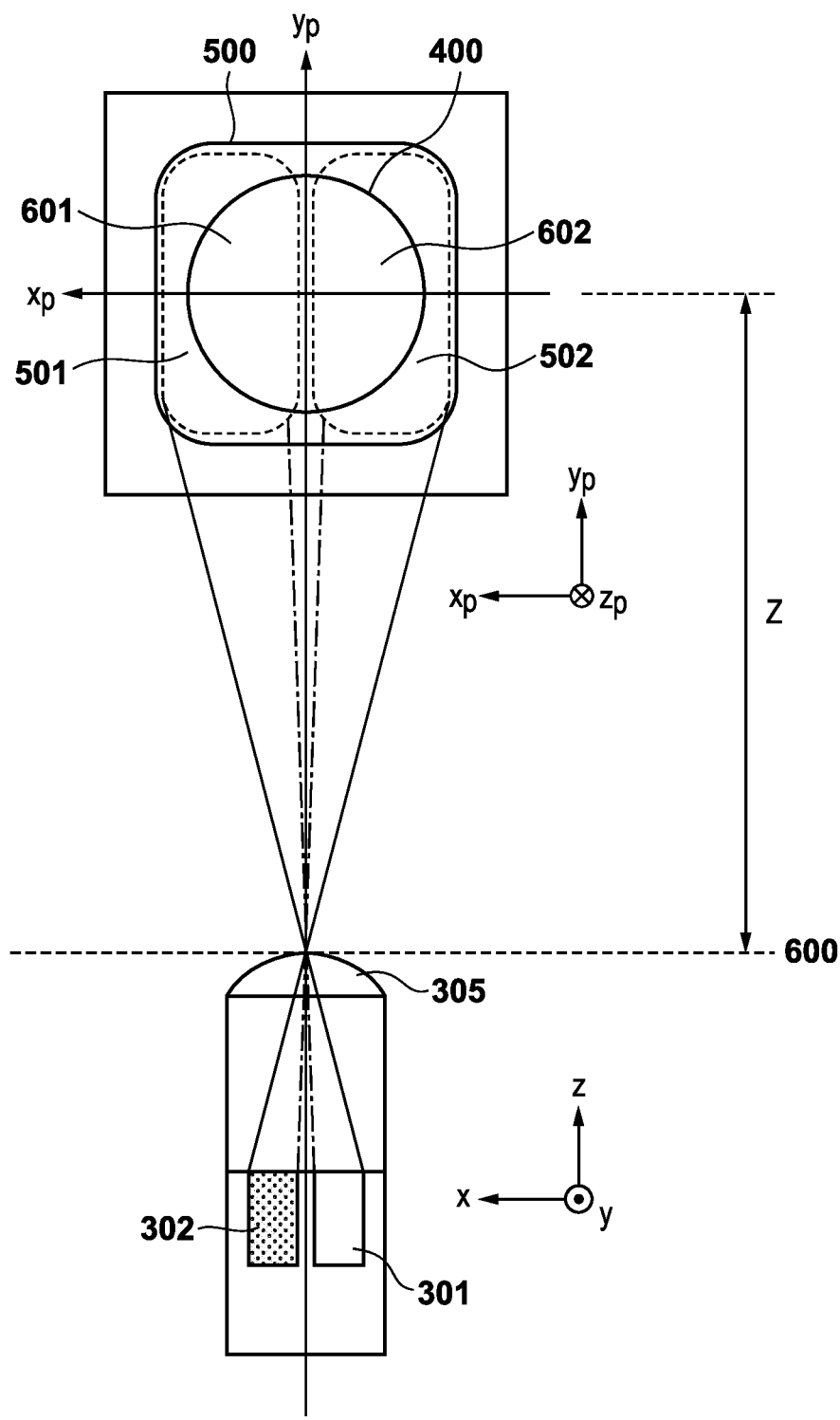
FIG. 4 is a diagram illustrating correspondence between a pixel in an image sensor according to an embodiment and a pupil intensity distribution.

FIG. 4 illustrates a cross-sectional view of an a-a cross-section of the pixel 200G arranged in the image sensor 107 of the present embodiment illustrated in FIG. 3A, seen from the +y side, as well as a pupil plane located a distance Z in the z axis direction (the direction of the optical axis OA) from an image capturing plane 600 of the image sensor 107. Note that in FIG. 4, the x axis and the y axis of the cross-sectional view are inverted with respect to FIGS. 3A and 3B in order to correspond to the coordinate axes of the exit pupil plane. The image capturing plane 600 of the image sensor 107 is located on an image formation plane of the image capturing optical system.

A pupil intensity distribution (first pupil intensity distribution) 501 is, through the microlens 305, in a substantially conjugate relationship with the light receiving surface of the first photoelectric conversion unit 301, a center of gravity position of which is eccentric in the −x direction. Accordingly, the first pupil intensity distribution 501 corresponds to a pupil area in which light can be received by the first sub-pixel 201. The center of gravity position of the first pupil intensity distribution 501 is eccentric to a +xp side on the pupil plane. Likewise, a pupil intensity distribution (second pupil intensity distribution) 502 is, through the microlens 305, in a substantially conjugate relationship with the light receiving surface of the second photoelectric conversion unit 302, a center of gravity position of which is eccentric in the +x direction.

Accordingly, the second pupil intensity distribution 502 corresponds to a pupil area in which light can be received by the second sub-pixel 202. The center of gravity of the second pupil intensity distribution 502 is eccentric to a −xp side on the pupil plane. A pupil intensity distribution 500 is a pupil area in which light can be received by the entire pixel 200G when all of the first photoelectric conversion units 301 and the second photoelectric conversion units 302 (the first sub-pixels 201 and the second sub-pixels 202) are combined. In other words, the first pupil intensity distribution 501 is eccentric to the +xp side on the pupil plane relative to the center of the pupil intensity distribution 500, and the second pupil intensity distribution 502 is eccentric to the −xp side on the pupil plane relative to the center of the pupil intensity distribution 500.

Additionally, in FIG. 4, a pupil area 500 is a pupil area through which light can be received by the entire pixel 200G when the photoelectric conversion units 301 and the photoelectric conversion units 302 (the first sub-pixels 201 and the second sub-pixels 202) are all combined.

Figure 5A:
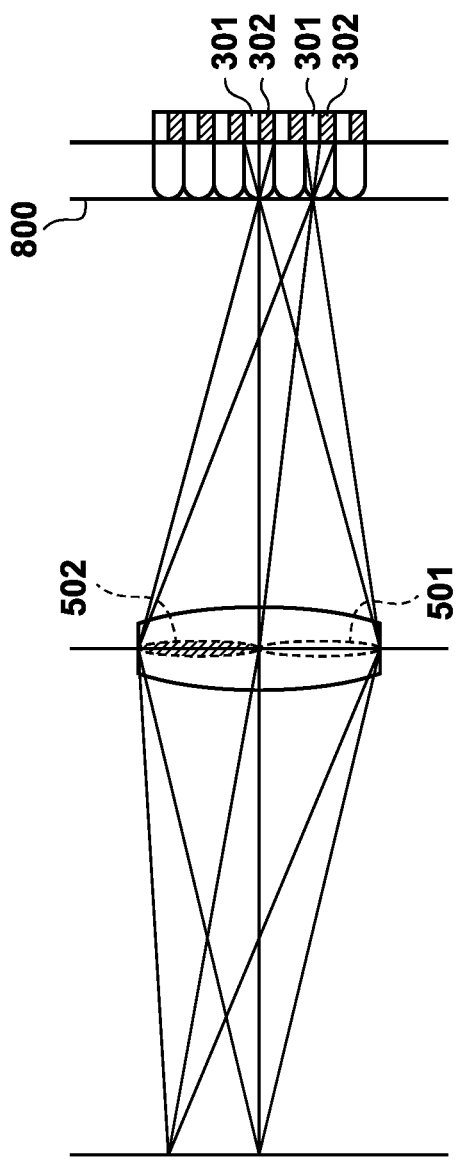
FIGS. 5A and 5B are diagrams illustrating a relationship between a defocus amount and an image shift amount according to an embodiment.

FIG. 5A is a schematic diagram illustrating the correspondence relationship between the image sensor and pupil divisions according to the present embodiment. Light fluxes passing through different partial pupil areas, namely a first partial pupil area 501 and a second partial pupil area 502, are incident on each (image capturing) pixel of the image sensor from an image capturing plane 800 at different angles, and are received by the photoelectric conversion units 301 and 302 divided into 2×1. Although the pupil area is pupil-divided into two in the horizontal direction in the present embodiment, pupil division may also be implemented in the vertical direction if necessary.

Image capturing pixels, each having the first sub-pixel 201 which receives the light flux passing through the first partial pupil area 501 of the image capturing optical system and the second sub-pixel 202 which receives the light flux passing through the second partial pupil area 502 of the image capturing optical system that is different from the first partial pupil area, are arranged in the image sensor 107. Accordingly, each image capturing pixel receives a light flux passing through the pupil area 500, which is a combination of the first partial pupil area 501 and the second partial pupil area 502 of the image capturing optical system.

Note that instead of every pixel of the image sensor 107 having a plurality of photoelectric conversion units (sub-pixels), an image capturing pixel, a pixel having only the first sub-pixel, and a pixel having only the second sub-pixel may be arranged separately. Alternatively, a pixel having two sub-pixels and a pixel having one photoelectric conversion unit for two sub-pixels may be arranged.

In the present embodiment, the image processing circuit 125 generates one instance of phase detection AF image data (a first focus detection signal (an A image)) by concatenating a plurality of signals obtained by adding the outputs of the four first sub-pixels 201 for each unit of repetition of the color filters illustrated in FIG. 2. Additionally, the image processing circuit 125 generates a second focus detection signal (a B image) by concatenating a plurality of signals obtained by adding the outputs of the four second sub-pixels 202 for each unit of repetition of the color filters.

In this manner, the first and second sub-pixels 201 and 202 are used to generate focus detection signals, and are therefore also called focus detection pixels. By adding the outputs of the same type of sub-pixels present within the unit of repetition of the color filters, a signal reflecting the respective color components of R, G, and B is obtained, which can be treated as a luminance signal with little spectral sensitivity bias. Note that when obtaining a captured image, the signal is obtained by adding the output of the first sub-pixel 201 and the output of the second sub-pixel 202 in units of pixels.

Relationship Between Defocus Amount and Image Shift Amount

Figure 5B:
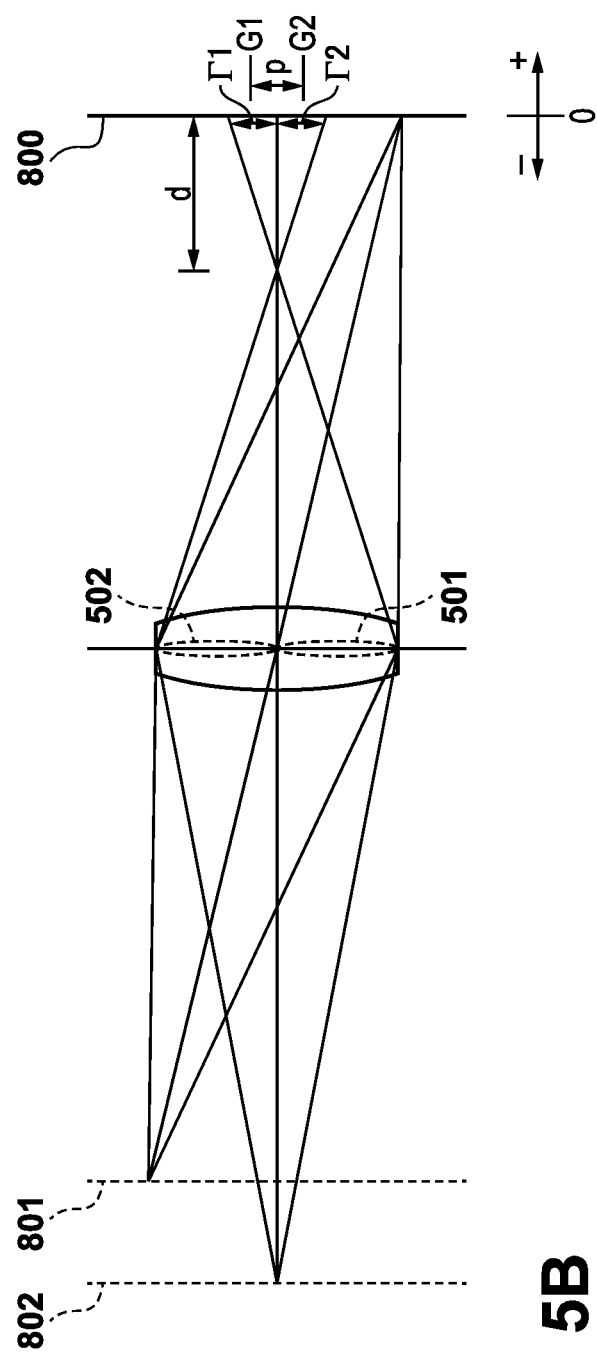

A relationship between an image shift amount in a pair of focus detection signals (the A image and the B image) generated by the image processing circuit 125, and a defocus amount of the optical system with respect to the subject (a focus condition) in the present embodiment, will be described next. FIG. 5B is a diagram schematically illustrating the relationship between the defocus amount and an image shift amount between the first focus detection signal (the A image) and the second focus detection signal (the B image). The image sensor 107 is arranged on the image capturing plane 800, and as described with reference to FIGS. 4 and 5A, the exit pupil of the image capturing optical system is divided into two areas, namely the first partial pupil area 501 and the second partial pupil area 502.

A magnitude of a defocus amount d is a distance from an image formation position of the subject to the image capturing plane 800. When the defocus amount d is negative (d<0), this indicates a forward focus state in which the image formation position of the subject is on the subject side of the image capturing plane 800, whereas when the defocus amount d is positive (d>0), this indicates a rearward focus state in which the image formation position of the subject is on the opposite side of the subject from the image capturing plane 800. The magnitude of the defocus amount d is 0 in an in-focus state, in which the image formation position of the subject is located on the image capturing plane 800. FIG. 5A illustrates an example in which a subject 801 is in an in-focus state (d=0), and a subject 802 is in a forward focus state (d<0). The forward focus state (d<0) and the rearward focus state (d>0) will be collectively referred to as a defocus state (|d|>0).

In the forward focus state (d<0), of the light flux from the subject 802, a light flux passing through the first partial pupil area 501 (the second partial pupil area 502) is first focused at a position further on the subject side than the image capturing plane 800. The light flux then spreads to a width Γ1 (Γ2) centered on a center of gravity position G1 (G2) of the light flux, becoming a blurry image at the image capturing plane 800. The blurry image is converted into an electrical signal by the first sub-pixel 201 (the second sub-pixel 202) in each of the plurality of pixels which receives the light flux. Then, as described above, the phase detection AF unit generates the first focus detection signal (the A image) from the signal from the first sub-pixel 201, and generates the first focus detection signal (the B image) from the signal from the second sub-pixel 202. Accordingly, the A image (the B image) is recorded as a subject image in which the subject 802 is blurred at the width Γ1 (Γ2) at the center of gravity position G1 (G2) on the image capturing plane 800.

The blur width Γ1 (Γ2) of the subject image increases roughly proportionally with an increase in the magnitude of the defocus amount d. Similarly, a magnitude |p| of an image shift amount p of the subject image between the first focus detection signal and the second focus detection signal (p=a difference between the center of gravity positions of the light fluxes, i.e., G1−G2) also increases roughly proportionally with an increase in the magnitude |d| of the defocus amount d. In the rearward focus state (d>0), the magnitude |d| of the defocus amount has a similar relationship with the blur width of the subject image and the image shift amount p, except that the direction in which the A image and the B image are shifted is opposite from that in the forward focus state.

Accordingly, the magnitude of the image shift amount between the A image and the B image increases with the increase in the magnitude of the defocus amount. The image sensor 107 that generates the first focus detection signal and the second focus detection signal, and the CPU 121 that calculates the defocus amount from the image shift amount p, function as a focus detection means.

Focus Detection Area

Figure 6:
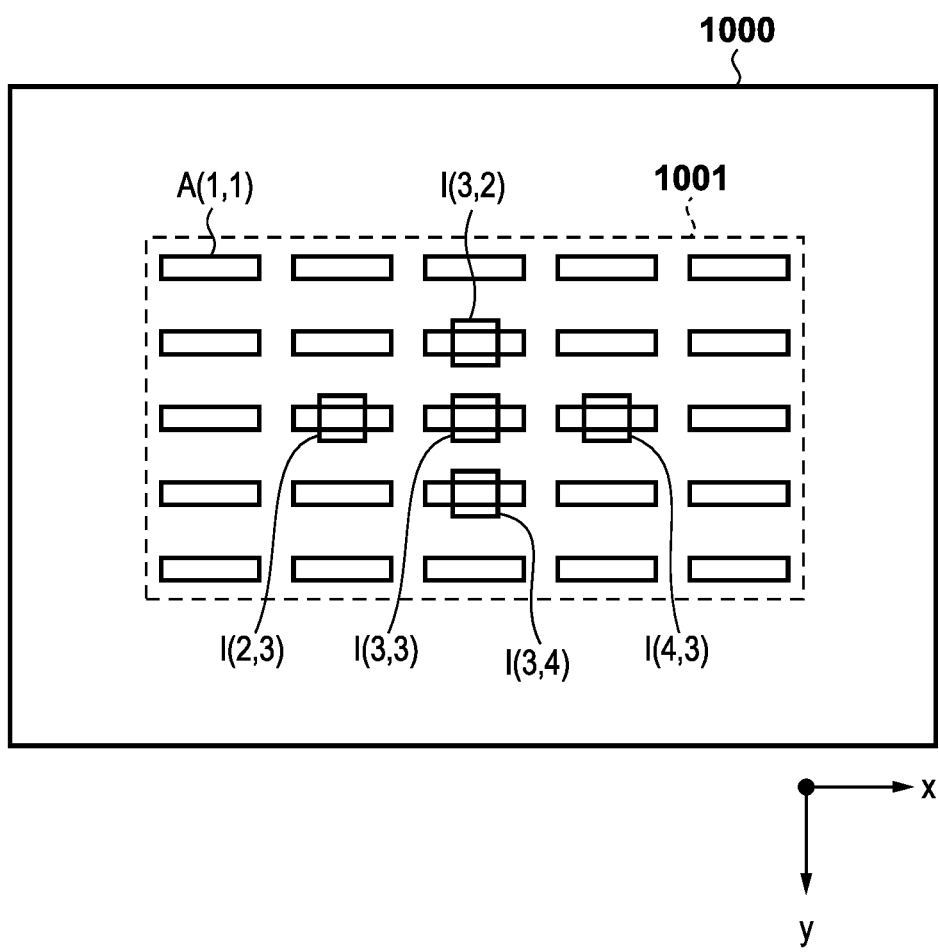
FIG. 6 is a diagram illustrating a focus detection area according to an embodiment.

The area, of the pixel area of the image sensor 107, which is used to generate the first focus detection signal and the second focus detection signal (that is, a focus detection area), will be described next. FIG. 6 illustrates an example of unit focus detection areas set in an effective pixel area 1000 of the image sensor 107, overlaid with an indicator (an AF frame) of the focus detection areas displayed in the display unit 131 during focus detection. The indicator is displayed in order to inform the user of candidates for the unit focus detection areas that can be set, the unit focus detection area currently set, the unit focus detection area selected by the camera 100, and the like. The unit focus detection area where the indicator is displayed and the unit focus detection area used by the camera 100 for focus control do not necessarily match.

Although the present embodiment assumes that a total of 25 unit focus detection areas, namely five in the row (x) direction and five in the column (y) direction, are set, this is merely one example, and a greater or smaller number of unit focus detection areas may be set. The sizes, positions, and spacing of the unit focus detection areas may be different as well.

In FIG. 6, a unit focus detection area n-th in the horizontal direction and an m-th in the vertical direction are denoted as A(n,m). In addition, a rectangular frame-shaped indicator representing the A(n,m) unit focus detection area is denoted as I(n,m). The signals obtained from the first sub-pixels 201 and the second sub-pixels 202 in the unit focus detection area are used to generate the A image and the B image used to detect the defocus amount in that unit focus detection area. Additionally, the indicator I(n,m) is normally displayed superimposed on the live view image.

Here, the unit focus detection area A(n,m) for which the indicator I(n,m) is not displayed is used in a supplementary manner when the main subject has left the unit focus detection area A(n,m) for which the indicator I(n,m) is displayed.

In the present embodiment, a focus detection area 1001 can be set so as to include the unit focus detection area A(n,m) for which the indicator I(n,m) is displayed and the unit focus detection area A(n,m) for which the indicator I(n,m) is not displayed. Although the focus detection area 1001 is set so as to encompass all 25 of the unit focus detection areas in FIG. 6, unit focus detection areas not included in the focus detection area 1001 may be present as well.

When all of the pixels in the effective pixel area 1000 include the first sub-pixel 201 and the second sub-pixel 202, as in the image sensor 107, the positions, sizes, and the like of the focus detection areas may be set dynamically. For example, the focus detection may be performed using an area including a plurality of unit focus detection areas centered on a position specified by the user. In the present embodiment, the unit focus detection areas are set so as to obtain a higher-resolution focus detection result when obtaining a defocus map, which will be described later. For example, each of a total of 9600 areas, obtained by dividing the effective pixel area 1000 into 120 parts in the horizontal direction and 80 parts in the vertical direction, is set as a unit focus detection area. Then, the focus detection area can be set such that the unit focus detection area A in which the indicator I is displayed, and the unit focus detection areas A in the periphery thereof for which the indicator I is not displayed, are included.

Operation in Image Capture Mode

Figure 7:
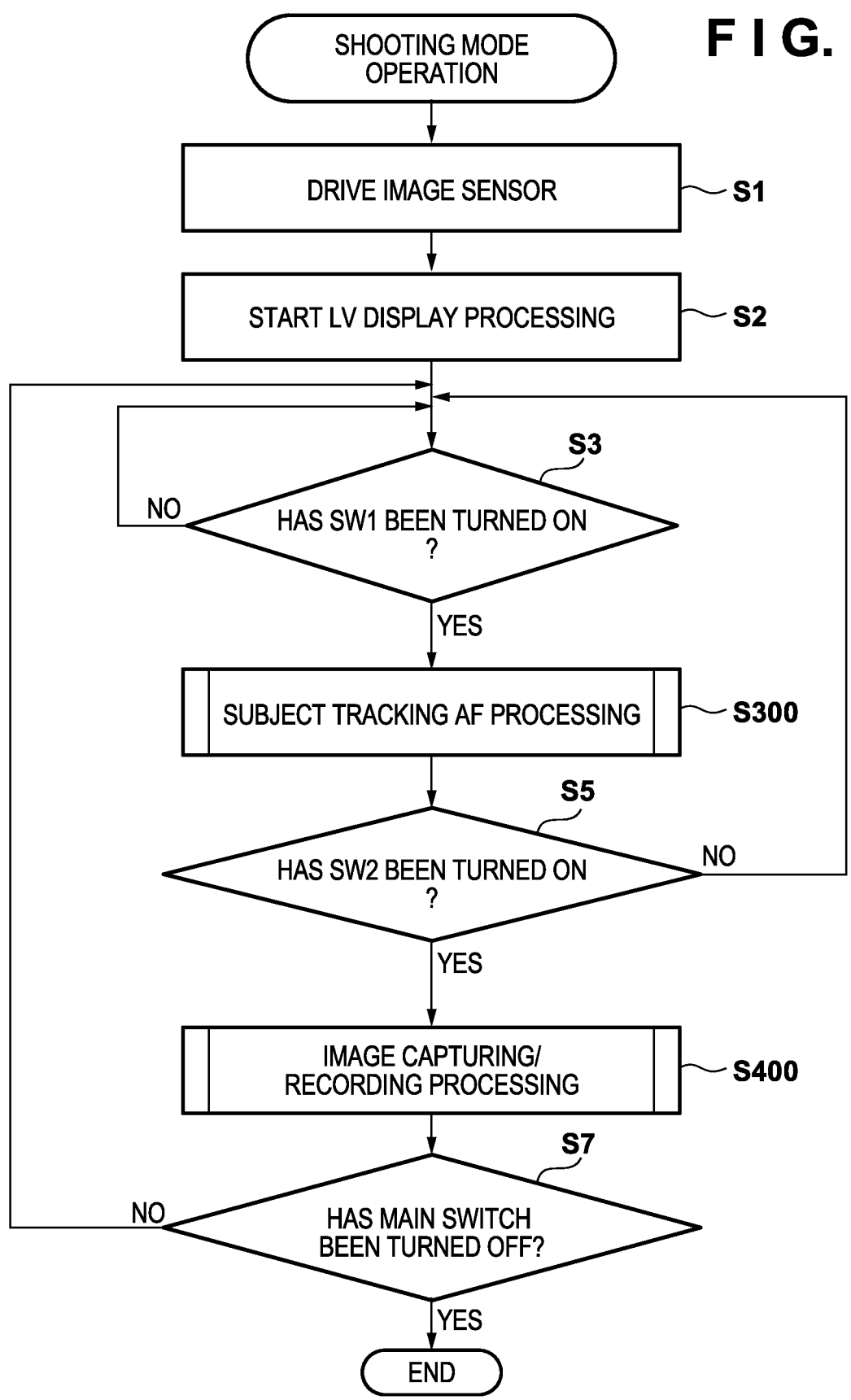
FIG. 7 is a flowchart pertaining to shooting mode operation according to an embodiment.

Operational steps performed in an image capture mode of the camera 100 will be described with reference to the flowchart in FIG. 7. The camera 100 operates in the image capture mode when the power is turned on and startup processing is complete.

In the image capture mode, the camera 100 stands by for the input of a user instruction while causing the display unit 131 to function as an EVF by continually capturing a moving image and displaying the obtained moving image in the display unit 131.

In step S1, the CPU 121 starts driving the image sensor 107 through the image sensor drive circuit 124 to capture a moving image for display in the display unit 131. Thereafter, the image sensor 107 outputs an analog image signal at a predetermined frame rate.

Upon obtaining one frame's worth of the analog image signal from the image sensor 107, the CPU 121 applies correlated double sampling, A/D conversion, and the like to generate a digital image signal. The CPU 121 outputs the digital image signal to the image processing circuit 125. The image processing circuit 125 applies demosaicing and the like to the digital image signal, and generates display image data. The image processing circuit 125 writes the display image data into a video memory region in the RAM 136, for example. Additionally, the image processing circuit 125 generates, from the digital image signal, evaluation values used in AE processing, and outputs the evaluation values to the CPU 121. Furthermore, for each of the plurality of unit focus detection areas, the image processing circuit 125 generates, and outputs to the CPU 121, the first and second focus detection signals, based on the signals read out from the pixels included in the unit focus detection area.

Note that when the first and second sub-pixels 201 and 202 are configured as separate pixels (that is, do not share the same microlens), the pixel coordinates from which the signal is obtained from the first sub-pixel 201 and the pixel coordinates for which the signal is obtained from the second sub-pixel 202 are different. Accordingly, the image processing circuit 125 generates the first and second focus detection signals by interpolating the signals such that signal pairs of the first and second sub-pixels 201 and 202 are present at the same pixel position.

In step S2, the CPU 121 supplies the display image data, which is stored in a video memory region of the RAM 136, to the display unit 131, and causes one frame of a live view image to be displayed. The user can adjust an image capture range, exposure conditions, and the like while viewing the live view image displayed in the display unit 131. The CPU 121 determines the exposure conditions based on the evaluation values obtained from the image processing circuit 125, and displays an image indicating the determined exposure conditions (shutter speed, aperture value, image capture ISO sensitivity) along with an image of the indicator I illustrated in FIG. 6 in the display unit 131 superimposed on the live view image. The photographer adjusts the shooting range such that the subject area to be focused on in the live view image overlaps with the indicator I.

Thereafter, the CPU 121 executes the operation of step S2 each time image capturing is completed for one frame. As a result, the display unit 131 functions as an EVF.

In step S3, the CPU 121 determines whether the release switch included in the operation unit 132 being depressed halfway (SW1 turning on) has been detected. The CPU 121 repeats step S3 if it is determined that SW1 turning on has not been detected. On the other hand, the CPU 121 executes step S300 if it is determined that SW1 turning on has been detected.

In step S300, the CPU 121 executes subject tracking automatic focus detection (AF) processing. In step S300, the CPU 121 applies subject detection processing to the display image data, determines the focus detection area, and so on. The CPU 121 also executes predictive AF processing and the like to suppress a drop in the AF accuracy caused by a time difference between when the AF processing is executed and when the release switch being fully depressed (SW2 turning on) is detected. The operation performed in step S300 will be described in detail later.

In step S5, the CPU 121 determines whether SW2 turning on has been detected. The CPU 121 executes step S3 if it is determined that SW2 turning on has not been detected. On the other hand, the CPU 121 executes image capturing/recording processing in step S400 if it is determined that SW2 turning on has been detected. The operation performed in step S400 will be described in detail later.

In step S7, the CPU 121 determines whether a main switch included in the operation unit 132 turning off has been detected. The CPU 121 ends the operation of the image capture mode if it is determined that the main switch turning off has been detected. On the other hand, the CPU 121 executes step S3 if it is determined that the main switch turning off has not been detected.

Although the subject detection processing and the AF processing are described as being executed in response to a determination that SW1 turning on has been detected, the processing may be executed at other times. If the subject tracking AF processing of step S300 is executed before SW1 turning on is detected, the half-press operation can be omitted, and image capturing can be started immediately with a full-press operation.

Image Capturing/Recording Processing

Figure 8:
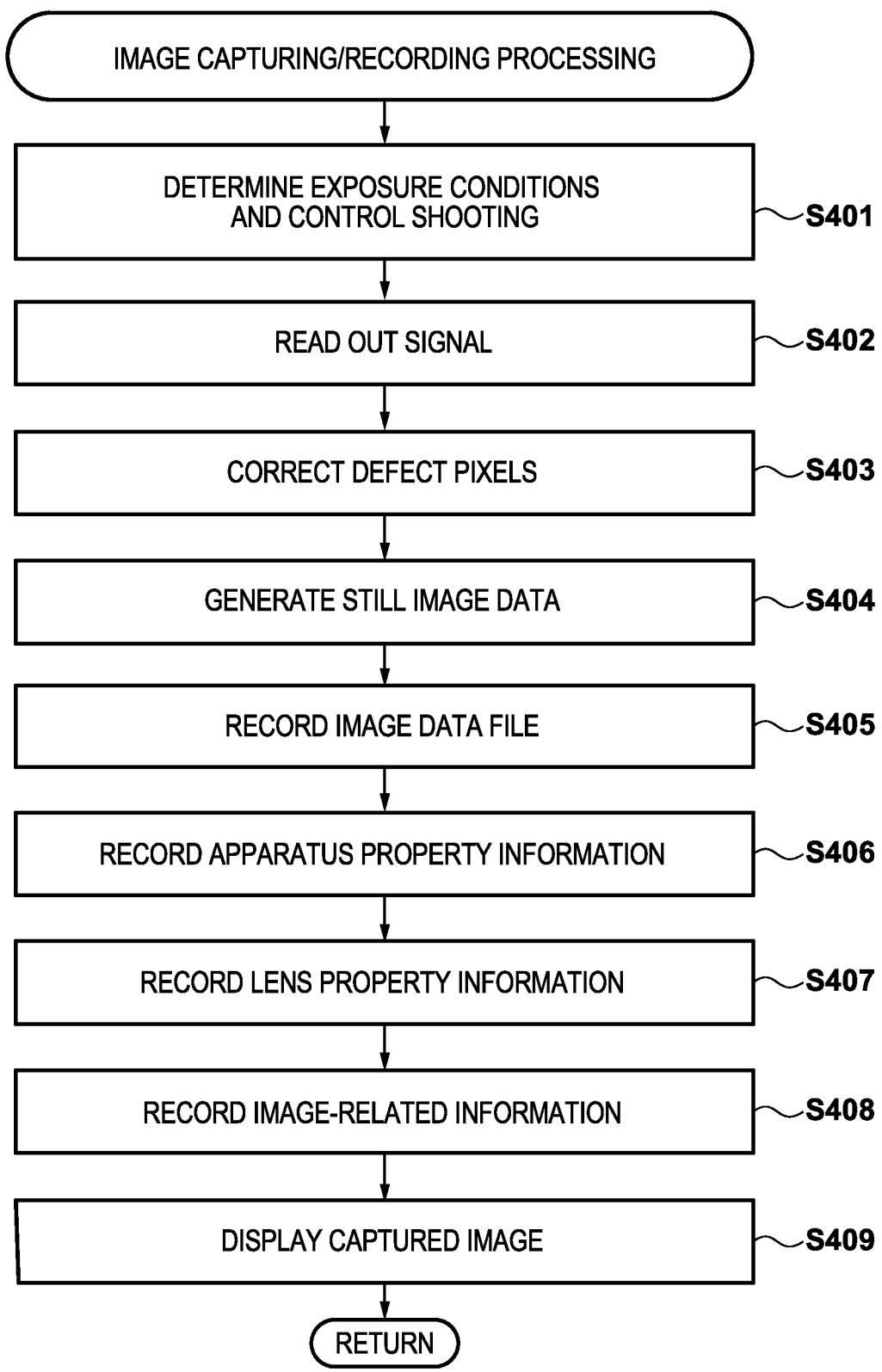
FIG. 8 is a flowchart pertaining to image capturing/recording processing according to an embodiment.

The image capturing/recording processing executed by the CPU 121 in step S400 in FIG. 7 will be described next with reference to the flowchart illustrated in FIG. 8.

In step S401, the CPU 121 determines the exposure conditions (shutter speed, aperture value, image capture ISO sensitivity, and the like) through AE processing based on the evaluation values generated by the image processing circuit 125. Then, the CPU 121 controls the operation of the respective units to capture a still image according to the determined exposure conditions.

In other words, the CPU 121 transmits the aperture value and the shutter speed to the aperture drive circuit 128 and drives the aperture stop 102. The CPU 121 also controls charge accumulation operation of the image sensor 107 through the image sensor drive circuit 124.

In step S402, the CPU 121 reads out one frame's worth of an analog image signal from the image sensor 107 through the image sensor drive circuit 124. Note that the signals of one of the first and second sub-pixels 201 and 202 are also read out for at least the pixels within the focus detection area.

In step S403, the CPU 121 applies analog-to-digital (A/D) conversion to the signal that was read out in step S402 to obtain a digital image signal. The CPU 121 also applies defective pixel correction processing to the digital image signal using the image processing circuit 125. The defective pixel correction processing is processing of supplementing signals read out from pixels from which normal signals cannot be read out (defective pixels) with signals read out from surrounding normal pixels.

In step S404, the CPU 121 causes the image processing circuit 125 to generate a still image data file for recording, as well as the first and second focus detection signals. The image processing circuit 125 applies image processing, encoding processing, and the like to the digital image signal after the defective pixel correction processing, and generates still image data for recording. The image processing may include, for example, demosaicing (color interpolation) processing, white balance adjustment processing, γ correction (tone correction) processing, color conversion processing, edge enhancement processing, and the like. The image processing circuit 125 also applies, to the still image data, encoding processing using a method based on the format of the data file that stores the still image data.

In step S405, the CPU 121 records, in the recording medium 133, the image data file which holds the still image data generated in step S404 and the signals of the sub-pixels read out from the focus detection area in step S402.

In step S406, the CPU 121 records apparatus property information as property information of the camera 100 in association with the image data file recorded in step S405 in the recording medium 133.

The apparatus property information includes the following information, for example.
  image capture conditions (aperture value, shutter speed, image capture sensitivity, and the like)
  information on the image processing applied to the digital image signal by the image processing circuit 125
  information on a light reception sensitivity distribution of the image capturing pixels and the sub-pixels in the image sensor 107
  information on vignetting of the image capture light flux within the camera 100
  information on the distance from the mounting surface of the image capturing optical system to the image sensor 107 in the camera 100
  information on manufacturing error in the camera 100

The information on the light reception sensitivity distribution of the image capturing pixels and the sub-pixels (called simply "light reception sensitivity distribution information" hereinafter) is information on a light reception sensitivity of the image sensor 107 according to a distance from a point of intersection between the image sensor 107 and the optical axis. The light reception sensitivity depends on the microlenses 305 and the photoelectric conversion units 301 and 302 in the pixels, and may therefore be information on those elements. The light reception sensitivity distribution information may be information on changes in the sensitivity relative to the incident angle of light.

In step S407, the CPU 121 records lens property information, as property information of the image capturing optical system, in the recording medium 133 in association with the still image data file recorded in step S405.

The lens property information includes the following information, for example.
  information on the exit pupil
  information on frames in the lens barrel and the like which cause vignetting of the light flux
  information on the focal length, F number, and the like during image capture
  information on aberration in the image capturing optical system
  information on manufacturing error in the image capturing optical system
  the position of the focus lens 105 during image capture (a subject distance)

Next, in step S408, the CPU 121 records image-related information, as information on the still image data, in the recording medium 133 in association with the still image data file recorded in step S405. The image-related information includes, for example, information on focus detection operation before image capture, information on movement of the subject, and information on focus detection accuracy.

Note that in steps S406 to S408, the CPU 121 may store the apparatus property information, the lens property information, and the image-related information in the RAM 136 in association with the image data file recorded in step S405.

In step S409, the CPU 121 generates display image data by causing the image processing circuit 125 to scale the still image data, and displays the generated display image data in the display unit 131. The user can therefore confirm the captured image. The CPU 121 ends the image capturing/recording processing when a pre-set display time passes.

Subject Tracking AF Processing

The subject tracking AF processing performed in step S300 of FIG. 7 will be described next with reference to the flowchart in FIG. 9.

In step S301, the CPU 121 calculates the image shift amount (a phase difference) between the first and second focus detection signals generated for each of the plurality of unit focus detection areas in step S2. The image shift amount between the signals can be obtained as a relative position where the amount of correlation between the signals is maximum. The CPU 121 calculates a defocus amount as a focus condition for each unit focus detection area, from the calculated image shift amount.

As described above, in the present embodiment, each of a total of 9600 areas, obtained by dividing the effective pixel area 1000 into 120 parts in the horizontal direction and 80 parts in the vertical direction, is set as a unit focus detection area. The CPU 121 generates data in which the defocus amount calculated for each unit focus detection area is associated with the position of the area (a defocus map). The CPU 121 stores the generated defocus map in the RAM 136, for example.

In step S302, the CPU 121 executes subject detection processing using the subject detection unit 140. The subject detection unit 140 detects areas of at least one type of subject, and outputs, to the CPU 121, a detection result including the type of the subject, the position and size of the area, the reliability of the detection, and the like for each detected area.

Additionally, the CPU 121 performs processing for detecting the position of the subject and the current frame (tracking processing) based on the result of the subject detection processing in the current frame and the result of the subject detection processing in past frames. Note that when the subject cannot be detected through subject detection processing using a trained CNN included in the subject detection unit 140, the CPU 121 can estimate the position of the subject in the current frame through tracking processing using another method, such as template matching or the like. This will be described in detail later.

In step S303, the CPU 121 sets the focus detection area based on the result of the subject detection processing performed in step S302. In the present embodiment, the CPU 121 determines the main subject intended by the photographer based on the information of the detected subject, motion of the camera 100, and the like. The CPU 121 then sets a focus detection area including at least one appropriate unit focus detection area in the area of the main subject determined, and keeps the area of the main subject in focus. The setting of the focus detection area will be described in detail later.

In step S304, the CPU 121 obtains the defocus amounts of the unit focus detection areas included in the focus detection area set in step S303. The defocus amounts obtained here may be those calculated in step S301, or may be defocus amounts calculated again for a new frame. The defocus amount for at least one unit focus detection area present in the periphery of the focus detection area set in step S303 may be obtained as well.

In step S305, the CPU 121 performs the predictive AF processing using the defocus amounts obtained in step S304 and the defocus amounts obtained in the past. This is processing which is necessary when there is time lag between the timing of the focus detection and the timing of image exposure, and is processing that controls AF by predicting the position of the subject after a predetermined time relative to the timing of focus detection. This will be described in detail later.

In step S306, the CPU 121 executes focus adjustment processing for capturing the next frame based on the defocus amount predicted in step S305 for the main subject. The CPU 121 converts the defocus amount into a drive direction and drive amount of the focus lens, controls the focus actuator 114 through the focus drive circuit 126, and drives the focus lens 105. This will be described in detail later. Once the driving of the focus lens 105 is complete, the CPU 121 ends the subject tracking AF processing.

Subject Detection/Tracking Processing

The subject detection/tracking processing performed in step S302 of FIG. 9 will be described in detail next with reference to the flowcharts in FIG. 10.

In step S2000, the CPU 121 sets the dictionary data to be used by the subject detection unit 140 by determining the type of subject to be detected by the subject detection unit 140. The type of subject to be detected can be determined based on a pre-set priority level, settings in the camera 100 (e.g., a shooting mode), and the like. For example, assume that dictionary data for "person", "vehicle", and "animal" is stored in the dictionary data storage unit 141. Note that the subject types may be classified in more detail. For example, dictionary data such as "dog", "cat", "bird", "cow", or the like may be stored instead of "animal", and "four-wheeled vehicle", "two-wheeled vehicle", "train", "airplane", or the like may be stored instead of "vehicle".

When the camera 100 is set to a shooting mode for shooting a specific type of subject, the CPU 121 sets the dictionary data for that subject type. For example, if a portrait mode or a sports mode is set, dictionary data for "person" is set. If a "panning shooting mode" is set, the dictionary data for "vehicle" is set as well.

When the camera 100 is not set to a shooting mode for shooting a specific type of subject, the CPU 121 sets the dictionary data for the subject according to a pre-set priority level. For example, dictionary data for "person" and "animal" can be set.

The method of determining the type of the dictionary data and the dictionary data to be set is not limited to the method described here. One or more instances of the dictionary data may be set. If one instance is set, subjects which can be detected using one instance of dictionary data can be detected with high frequency. If a plurality of instances of dictionary data are set, a plurality of types of subjects can be detected by switching dictionaries on a frame-by-frame basis. Note that if the processing time allows, a plurality of types of subjects may be detected for the same frame.

In step S2001, the CPU 121 applies detection processing for the subject to the image of the current frame using the subject detection unit 140. Assume here that the subject to be detected is a "person". The subject detection unit 140 applies the subject detection processing to the image of the current frame using the "person" dictionary data stored in the dictionary data storage unit 141. The subject detection unit 140 outputs a detection result to the CPU 121. At this time, the CPU 121 may display the subject detection result in the display unit 131. The CPU 121 also stores the detected subject area in the RAM 136.

Note that when "person" dictionary data is set, the subject detection unit 140 detects a plurality of types of areas having different granularities with respect to the person, such as a "whole body" area, a "face" area, and an "eye" area. It is desirable that local areas, such as a person's eyes and face, be detected for use in focus detection, exposure control, and the like, but these may not be detected due to the face not facing forward or being hidden by other subjects. On the other hand, it is unlikely that the whole body will be completely undetectable. Accordingly, areas of a plurality of types having different granularities are detected, which increases the likelihood that some area of the "person" can be detected.

Note that the dictionary data can be configured to detect areas of a plurality of types having different granularities for types of subjects other than people. For example, if "vehicle" dictionary data is set, the dictionary data can be configured such that the subject detection unit 140 detects the "head" and/or "face" area of an occupant in addition to the area of the entire vehicle (including a rider on a two-wheeled vehicle and an occupant of a racecar).

In step S2002, the CPU 121 executes subject tracking processing by applying template matching processing to the current frame using the subject area most recently detected in step S2001 as a template. The image itself of the subject area may be used as the template, or information obtained from the subject area, such as luminance information, color histogram information, feature point information such as corners and edges, or the like may be used as a template. Any publicly-known method for matching, updating a template, or the like can be used. The CPU 121 saves the position and size of the area most closely resembling the template in the current frame (the subject area), motion of the area between frames, the detection reliability of the area, and the like in the RAM 136 as a result of the tracking processing.

The tracking processing in step S2002 may be performed only when no subject is detected in step S2001. By detecting, in the current frame, an area similar to the subject area detected in the past, stable subject detection/tracking processing can be achieved. The CPU 121 ends the subject detection/tracking processing by ending the tracking processing.

Setting Focus Detection Area

Figure 11:
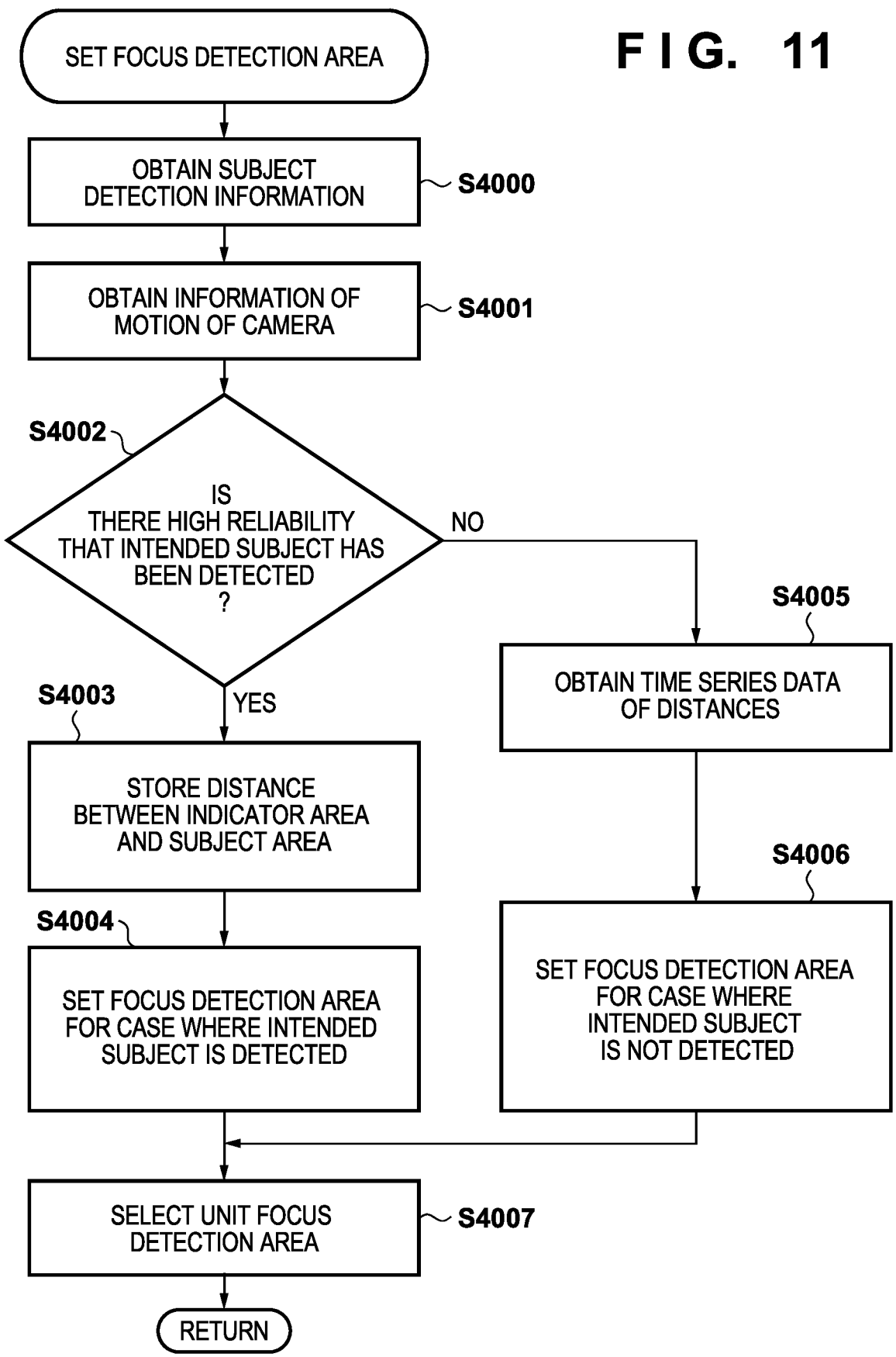
FIG. 11 is a flowchart illustrating processing for setting a focus detection area according to a first embodiment.

Next, the setting of the focus detection area in step S303 of FIG. 9 will be described in detail with reference to the flowchart in FIG. 11.

In step S4000, the CPU 121 obtains, from the RAM 136, the result of the subject detection/tracking processing performed in step S302 of FIG. 9 (subject detection information). The subject detection information may be, for example, the position (e.g., center of gravity coordinates), the size, motion, the detection reliability, and the like of the subject area, for example.

In step S4001, the CPU 121 obtains information pertaining to motion of the camera 100 from the output of the motion detection unit 142.

In step S4002, the CPU 121 determines a reliability that the subject area for which the information was obtained in step S4000 is the subject intended by the photographer. The CPU 121 obtains image coordinates of the unit focus detection area set by the user (or the indicator (AF frame) corresponding to the unit focus detection area). Although the following will describe a case where the image coordinates of the indicator are obtained, the configuration can be implemented in a similar manner even if the image coordinates of the unit focus detection area are obtained.

The CPU 121 calculates a distance between the indicator and the subject area on the image sensor 107 as an indicator of the reliability that the subject intended by the photographer has been detected (that the detected subject area is the area of the subject intended by the photographer). If a plurality of subject areas are detected, the distance can be calculated for the subject area having the highest detection reliability, or the subject area closest to the indicator among subject areas for which the detection reliability is at least a predetermined value. Note that if a plurality of indicators are being displayed, the CPU 121 calculates the distance between the subject area and the indicator closest to the subject area. Additionally, if the position of the indicator is within the subject area, the distance may be calculated as 0.

Then, if the calculated distance is less than a threshold, the CPU 121 determines that there is a high reliability of the subject intended by the photographer being detected, and executes step S4003. Note that the threshold is, for example, a distance between adjacent unit focus detection areas in each of the x direction and the y direction, and the distance can be determined to be at least the threshold when both an x component and a y component of the distance are at least the threshold. However, this is merely an example, and the threshold may be set, the distance may be generated, and so on through different methods.

On the other hand, if the calculated distance is at least the threshold, the CPU 121 determines that there is a low reliability of the subject intended by the photographer being detected, and executes step S4005. Of course, if not even one subject area is detected, or, for example, if there is not even one subject area having a detection reliability that is at least the threshold, the CPU 121 can determine that there is a low reliability of the subject intended by the photographer being detected.

The CPU 121 adds the result of the determination of step S4002 to the information of the subject area stored in the RAM 136.

In step S4003, the CPU 121 stores the distance (positional shift) between the position of the subject area and the position of the indicator, calculated in step S4002, in the RAM 136. The CPU 121 stores the distance between the position of the subject area and the position of the indicator in time series, for a predetermined number of the most recent times. This time series data of the distances depends on the motion of the subject, the skill of the photographer, and the like, and is therefore reset (deleted) when the shooting date, the subject type, or the like changes, after which the storage starts again.

In step S4004, the CPU 121 sets the focus detection area for the case where the subject intended by the photographer is detected. In this case, the CPU 121 sets the focus detection area including the unit focus detection areas where the indicator is displayed and the unit focus detection areas present within the subject area. Unit focus detection areas adjacent to the subject area may also be included. The CPU 121 then executes step S4007.

On the other hand, in step S4005, the CPU 121 obtains a history (time series data) of the distance or positional shift in the positions between the indicator and the subject area calculated in step S4003, which are stored in the RAM 136.

In step S4006, using the time series data of the distance obtained in step S4005, the CPU 121 sets the focus detection area for the case where the subject intended by the photographer is not detected. The time series data of the distance reflects the influence of (1) the framing skill of the photographer, (2) motion characteristics of the subject (movement speed, acceleration, and the like), (3) the focal length of the optical imaging system, which corresponds to an amount of fluctuation in the angle of view during framing, and the like. For example, when the photographer's framing skill is low, variance in the distance tends to be greater than when the photographer's skill is high, and the average value of the distance also tends to be greater.

The CPU 121 separates each distance included in the time series data into an x direction component and a y direction component, and calculates a standard deviation for each direction. The CPU 121 then sets a focus detection area having a length that includes the indicator position, and is a predetermined multiple of the standard deviation in the x direction and the y direction. For example, if the distance follows a normal distribution, setting a focus detection area having a size double the standard deviation in each direction centered on the position of the indicator makes it possible for the subject to be contained within the focus detection area at a probability of approximately 95%.

It is necessary to set the focus detection area to include the subject intended by the photographer. However, if the focus detection area is larger than the subject area, there is a possibility that the camera will focus on other subjects present in the background or the foreground of the intended subject. Accordingly, it is necessary to appropriately set the size of the focus detection area. Dynamically determining the focus detection area based on the time series data of the distance makes it possible to suppress the possibility of other subjects being focused on while increasing the possibility that the subject will fall within the focus detection area.

The size of the focus detection area can be determined dynamically through another method as well. For example, if the number of distance samples included in the time series data is low (less than or equal to a threshold), the size of the focus detection area may be determined based on a standard deviation calculated without separating the distance into the direction components.

Additionally, the focus detection area need not be rectangular as long as it is an area that encompasses a plurality of unit focus detection areas. Accordingly, the focus detection area can be set to any shape, such as a diamond, an ellipse, or the like. The focus detection area may be an asymmetrical shape that is larger in the direction of movement of the subject.

The focus detection area may also be set taking into account the motion information of the camera, obtained in step S4001. For example, when a framing speed is a second speed that is faster than a first speed, the size of the focus detection area from the position of the indicator, in the framing direction, can be greater than when the framing speed is the first speed.

Once the focus detection area is set in step S4006, the CPU 121 executes step S4007.

In step S4007, the CPU 121 selects the unit focus detection area A(n,m) included in the focus detection area set in step S4004 or step S4006. The CPU 121 then causes the indicator I(n,m) corresponding to the selected unit focus detection area A(n,m) to be displayed in addition to the indicators already displayed. Through this, the photographer can know the focus detection area which the camera 100 has set. Note that the user may be capable of setting whether to display the additional indicators.

Once the processing of step S4007 ends, the CPU 121 ends the setting of the focus detection area.

Specific Example of Setting Focus Detection Area

A specific example of setting the focus detection area in step S4004 or step S4006 of FIG. 11 will be described next with reference to FIGS. 12A to 13B.

FIGS. 12A to 12C schematically illustrate a scene in which a human subject swimming the butterfly moves in the horizontal direction from left to right, while the user sets one unit focus detection area in which the indicator I is displayed and performs framing with the camera 100 so that the subject is positioned in the indicator I. The detected subject area is indicated by M, the focus detection area by 1001, and the indicator by I.

At the point in time indicated in FIG. 12A, the indicator I is located slightly ahead in the direction of movement from the head of the subject which the photographer is attempting to bring into focus. In this scene, the subject's head is hidden under the water, or is above the water but hidden by splashing water or the hands. It is therefore not easy to frame the image such that the indicator I overlaps with the head, and the indicator I is in a position shifted from the head.

In FIG. 12A, the head of the subject is detected as the subject area M, and is close to the indicator I in terms of distance (is less than or equal to the threshold). Therefore, in step S4002 of FIG. 11 described earlier, the CPU 121 determines that there is a high reliability of the subject area M corresponding to the intended subject. As a result, in step S4004, the CPU 121 sets the focus detection area 1001 based on the subject area M. Although an example of setting the focus detection area 1001 with a slightly larger subject area M is described here, the subject area M may be set as-is as the focus detection area 1001.

FIG. 12B illustrates a case where the head is out of the water, but the subject area M is not detected due to the arms and water splashing. In this case, in step S4002 of FIG. 11, the CPU 121 determines that there is a low reliability of the subject area M corresponding to the intended subject. As a result, in step S4006, the CPU 121 sets the focus detection area based on the time series data of the distance between the subject area M and the indicator I detected in the past.

FIG. 12B illustrates an example of the focus detection area 1001 set when there is little variance in the time series data of the distance between the indicator and the subject area. The primary component of the distance between the indicator and the subject area is in the horizontal direction, which is the direction of the subject's movement. Accordingly, the CPU 121 sets the focus detection area 1001 at a size in the horizontal direction, which is the direction of the subject's movement, that is enlarged centered on the indicator I. Although not illustrated in FIG. 12B, the CPU 121 sets the focus detection area 1001 such that the number of unit focus detection areas included in the horizontal direction is greater than that in FIG. 12A.

FIG. 12C illustrates a case where the head has moved below the water and the subject area M is not detected. In this case, the CPU 121 sets the focus detection area 1001 similar to that illustrated in FIG. 12B. An example of the focus detection area 1001 set when there is a large amount of variance in the time series data of the distance between the indicator and the subject area is illustrated here.

For example, if the photographer's framing skill is low, the subject may be hidden from view, resulting in large amounts of variance in the distance. Variance in the distance is particularly great in the direction of the subject's movement (the horizontal direction). By determining the size of the focus detection area according to the magnitude of the variance in the distance, a focus detection area having a larger size is set for a photographer who has low framing skill than a focus detection area set for a photographer who has high framing skill. In FIG. 12C, a larger focus detection area 1001 is set in both the horizontal direction and the vertical direction than in FIG. 12B, but particularly in the direction of the subject's movement (the horizontal direction).

Figure 13A:
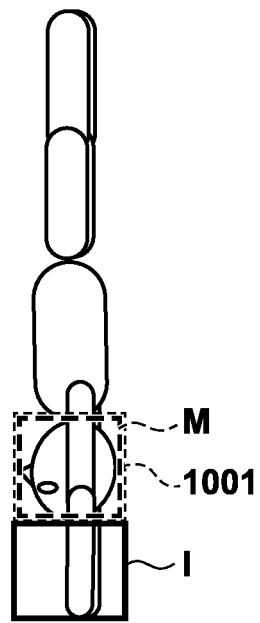
FIGS. 13A and 13B are diagrams illustrating a method for setting a focus detection area according to the first embodiment.
Figure 13B:
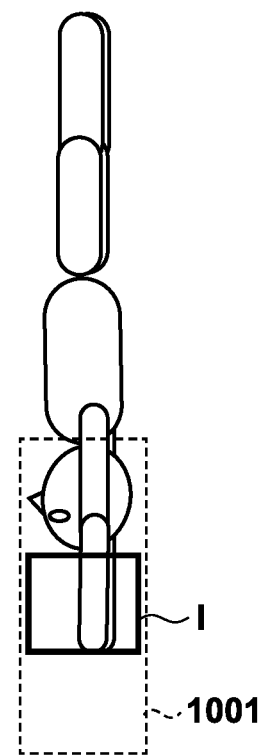

FIGS. 13A and 13B schematically illustrate a scene in which a human subject performing a dive in a competition moves in the vertical direction from top to bottom, while the user sets one unit focus detection area in which the indicator I is displayed and performs framing with the camera 100 so that the subject is positioned in the indicator I.

FIG. 13A illustrates an example of the focus detection area 1001 set when the subject area M is detected. The subject area M is in a position slightly shifted from the indicator I, but is close to the indicator I in terms of distance (is less than or equal to the threshold). Therefore, in step S4002 of FIG. 11 described earlier, the CPU 121 determines that there is a high reliability that the subject area M is the intended subject. As a result, in step S4004, the CPU 121 sets the focus detection area 1001 based on the subject area M. Although an example of setting the focus detection area 1001 with a slightly larger subject area M is described here, the subject area M may be set as-is as the focus detection area 1001.

FIG. 13B illustrates an example of the focus detection area 1001 set when the posture of the subject is almost the same as in FIG. 13A, but the subject area M cannot be detected due to the arms and the head overlapping. In this case, in step S4002 of FIG. 11, the CPU 121 determines that there is a low reliability that the subject area M is the intended subject. As a result, in step S4006, the CPU 121 sets the focus detection area based on the time series data of the distance between the subject area M and the indicator I detected in the past.

In the scenes illustrated in FIGS. 13A and 13B, the subject is moving in the vertical direction, and thus the primary component of the distance between the indicator and the subject area is the vertical direction. Accordingly, the CPU 121 sets the focus detection area 1001 at a size in the vertical direction, which is the direction of the subject's movement, that is enlarged centered on the indicator I. Here, although the area is enlarged by the same amount in the vertical direction with respect to the indicator I, the area may be enlarged to a greater extent in the direction of the subject's movement.

Figure 14A:
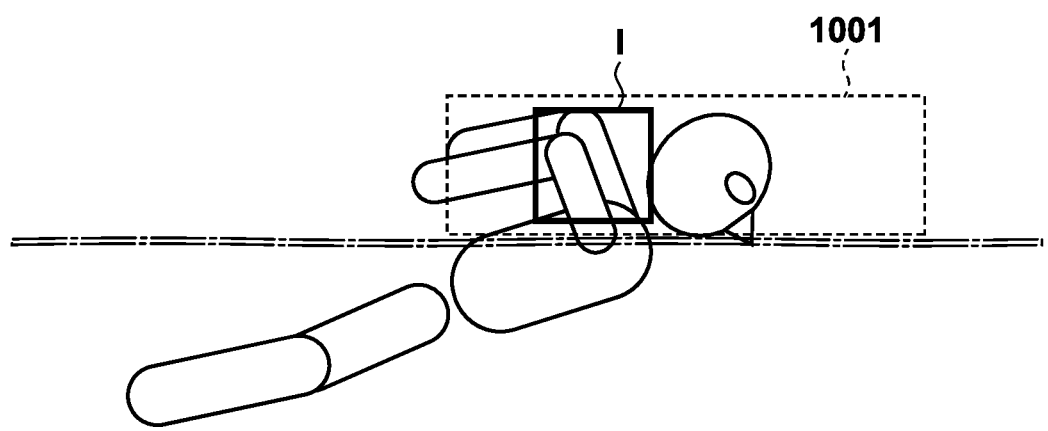
FIGS. 14A and 14B are diagrams illustrating a method for setting a focus detection area according to the first embodiment.

For example, FIG. 14A illustrates another example of a focus detection area set when the subject area cannot be detected or when the distance between the indicator and the subject area exceeds a threshold. Here, the direction of the subject's movement is the right direction in the drawing, and thus when the focus detection area is enlarged in the horizontal direction, the enlargement amount or enlargement rate is made greater in the right direction than in the left direction with respect to the indicator I.

Additionally, whether the framing action lags behind the movement of the subject (e.g., the average value of the distance is a negative value) or is ahead of the movement of the subject (e.g., the average value is a positive value) can be determined based on the time series data of the distance which is referenced. If the framing operation is determined to be lagging behind the movement of the subject, the enlargement amount or the enlargement rate in the forward direction of the movement may be increased compared to when the framing action is determined to be ahead of the movement of the subject.

Figure 14B:
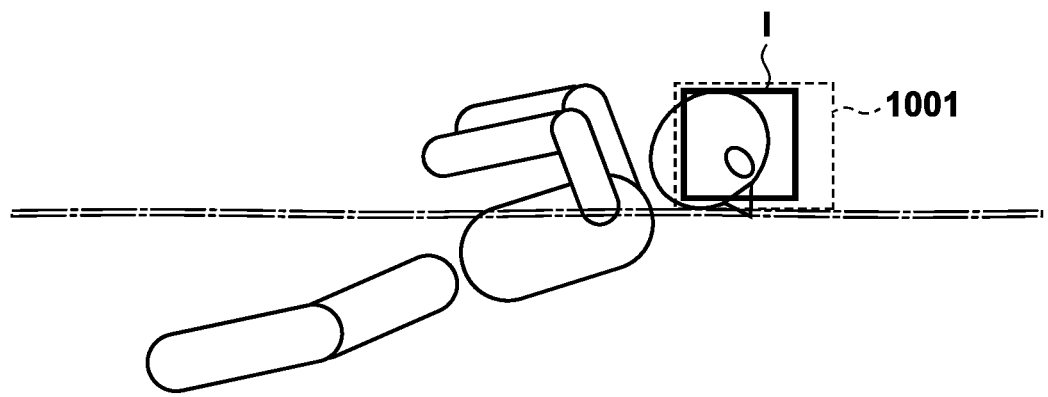

FIG. 14B illustrates the same situation as FIG. 14A, but in a state where the indicator I overlaps the subject's head and the shot is well-framed. In this case, it can be determined that the distance is small and there is little variance based on the time series data of the distance. In such a case, the focus detection area 1001 can be set slightly enlarged in the direction of the subject's movement without inadvertently enlarging the focus detection area.

Figure 15B:
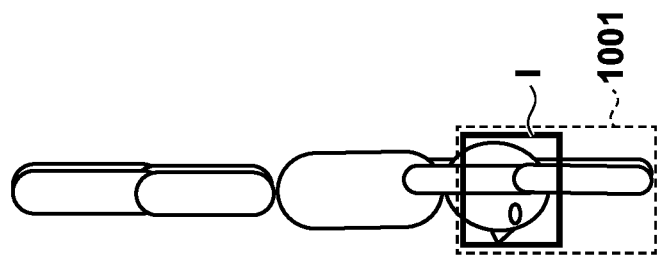
FIGS. 15A and 15B are diagrams illustrating a method for setting a focus detection area according to the first embodiment.
Figure 15A:
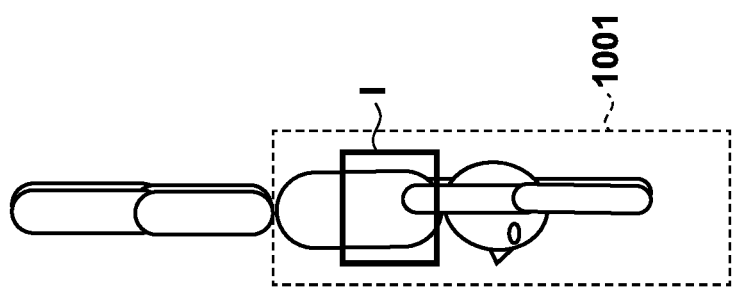

FIGS. 15A and 15B illustrate examples of the focus detection area 1001 set using basically the same method as in FIGS. 14A and 14B, except that the direction of the subject's movement is the vertical direction (top to bottom). However, the examples in FIGS. 15A and 15B are larger than the examples in FIGS. 14A and 14B because the speed at which the subject is moving is greater, and thus the downward enlargement, which corresponds to the direction of movement, is greater than in the examples illustrated in FIGS. 14A and 14B.

The speed at which the subject is moving can be detected using a shooting interval, a distance traveled between images shot, the subject distance, the motion information of the camera 100, or the like, but may also be detected by another method.

The time series data of the distance calculated in step S4003 and stored in the RAM 136 may be used, for example, without being reset while it is determined that a similar scene is being shot continuously. The CPU 121 can determine that the camera 100 is continuously shooting a similar scene when, for example, the camera 100 is determined to be repeatedly performing similar framing based on the motion information of the camera 100. Alternatively, the time series data of the distance may be reset at the point in time when one instance of framing ends.

Additionally, in setting the focus detection area 1001, information obtained from a neural network trained using data from the dictionary data storage unit 141 and the motion detection unit 142 may be taken into account. This makes it possible to set a focus detection area 1001 that is better suited to the characteristics of the individual photographer.

Setting Focus Detection Area According to Distance and Framing Amount

Thus far, a method has been described for determining the size of the focus detection area based on the variance (e.g., the standard deviation) and the magnitude (e.g., the average value) of the distance between the indicator position and the subject area calculated a plurality of times as time passes. However, the size of the focus detection area can be determined through another method as well.

FIG. 16 illustrates an example of determining the size (range) of the focus detection area based on a combination of the magnitude (e.g., the average value) of the distance between the indicator and the subject area, obtained from time series data, and the magnitude (e.g., the average value) of a framing amount. The magnitude of the framing amount (speed or acceleration) can be obtained from the motion of the camera 100 detected by the motion detection unit 142.

Here, the magnitude of the distance and the magnitude of the framing amount are assumed to be classified into two categories using predetermined thresholds for each, and the size of the focus detection area is assumed to be determined according to four different combinations. Note that at least one of the magnitudes may be classified into three or more categories.

For example, the CPU 121 calculates a representative value (e.g., the average value) of the magnitude of the distance between the indicator and the subject area from the time series data obtained in step S4005. The CPU 121 also calculates the framing amount of the camera 100 based on the motion of the camera 100 detected by the motion detection unit 142. The CPU 121 classifies each of the representative value of the magnitude of the distance and the framing amount as "large" or "small" by comparing the representative value of the magnitude of the distance and the framing amount with respective thresholds. The CPU 121 obtains one of focus detection area ranges A to D by referring to a table stored in the ROM 135 based on the combination of the classification results. The ranges A to D may be, for example, enlargement rates relative to a reference size (e.g., the size of the indicator I).

Basically, the enlargement rate is greater when the distance between the indicator and the subject area is large than when that distance is small. This is because the photographer's framing skill is considered to be low when the distance is large. The enlargement rate is greater when the framing amount is greater, too, than when the framing amount is small. This is because the subject is considered to be moving faster when the framing amount is large. Accordingly, of A through D, A is the largest and D is the smallest. For B and C, the magnitude relationship between B and C can vary according to the threshold used for the classification.

Note that the table in FIG. 16 may be prepared for both the x direction and the y direction. In this case, the representative value of the magnitude of the distance and the magnitude of the framing amount are also obtained in both the x direction and the y direction. By preparing enlargement rates for each direction, the focus detection area can be set at an enlargement rate corresponding to the direction of the subject's movement.

Predictive AF Processing

Figure 17:
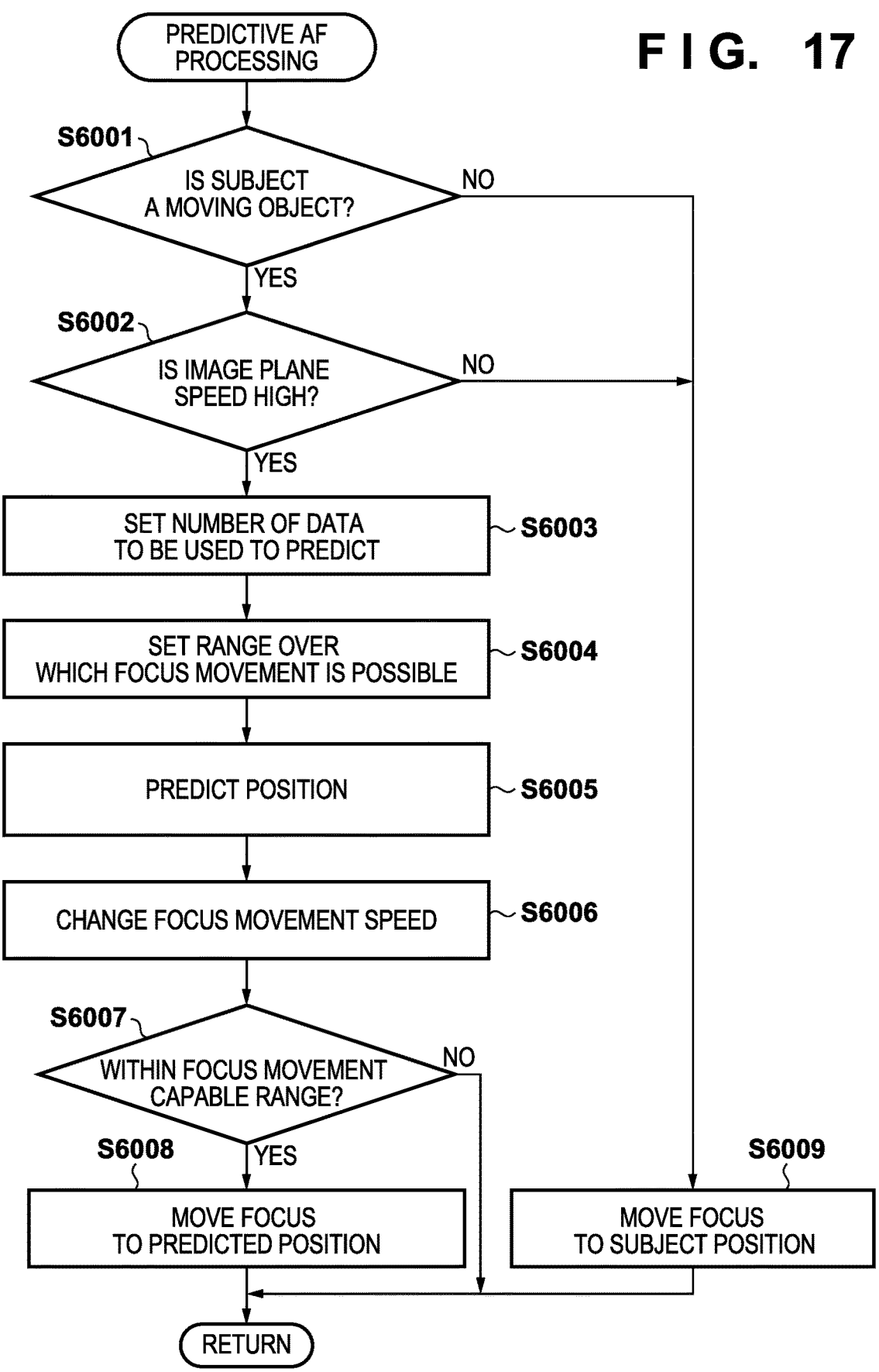
FIG. 17 is a flowchart illustrating predictive AF processing according to the first embodiment.

The predictive AF processing in step S305 of FIG. 9 will be described in detail next with reference to the flowchart in FIG. 17.

In step S6001, the CPU 121 determines whether the subject is a moving object moving in the optical axis direction. If the subject is determined to be a moving object moving in the optical axis direction, step S6002 is executed, and if not, step S6009 is executed. Whether the subject is a moving object moving in the optical axis direction can be determined based on changes in the defocus amount in the subject area or changes in the focal length by referring to time series data of the defocus map.

In step S6002, the CPU 121 determines whether an image plane speed of the subject is high. If the speed is high, step S6003 is executed, and if not, step S6009 is executed. The CPU 121 can determine that the image plane speed is high if, for example, an amount of inter-frame movement of the subject area (a difference in the defocus amount between frames arising due to movement in the optical axis direction) is at least a threshold.

Figure 18A:
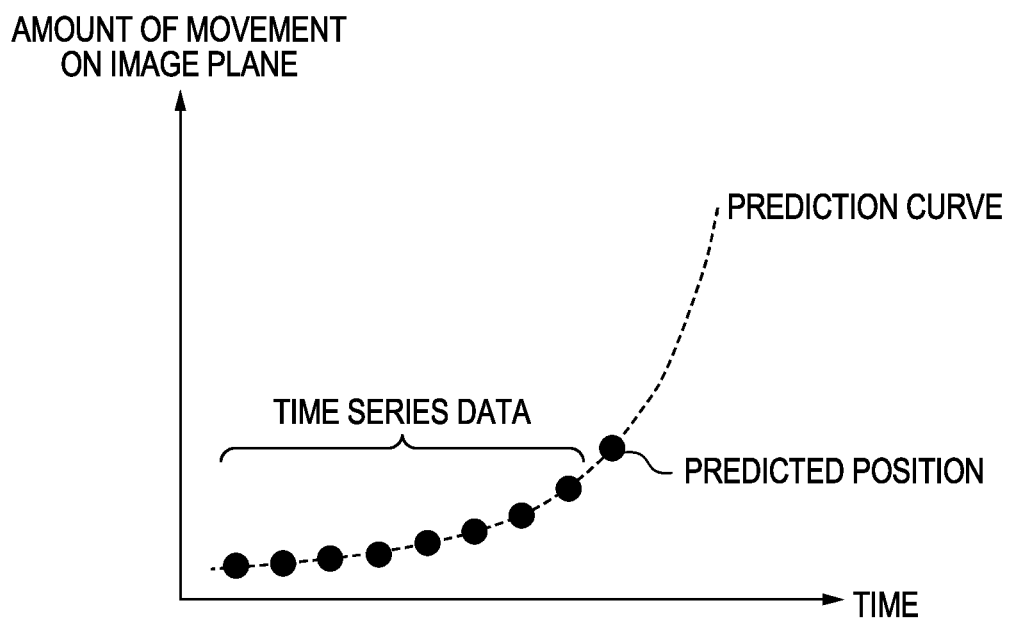
FIGS. 18A and 18B are diagrams illustrating an image plane shift amount of a subject and a prediction curve according to the first embodiment.

In step S6003, the CPU 121 sets a number of time series data to be used to predict the subject position. FIG. 18A is a diagram illustrating an example of the change over time of an image plane position of the subject. The horizontal axis represents time and the vertical axis represents the amount of movement on the image plane. The black circles indicate a time series of the amount of movement of the subject area detected in the past (the defocus amount, because this is movement in the optical axis direction). FIG. 18A illustrates a case where the amount of movement of the subject on the image plane increases as time passes. The position of the subject area in the future is predicted from the time series data.

If the image plane speed or acceleration of the subject is low, prediction error will not increase even if the number of time series data used for the prediction is increased. Rather, increasing the number reduces the impact of defocus amount error on the predicted position.

On the other hand, if the image plane speed or acceleration of the subject is high, increasing the number of time series data used for prediction will result in more data from periods when the image plane speed is low also being used for the prediction, which in turn produces more error in the predicted position.

Therefore, in the present embodiment, when the image plane speed or acceleration is determined to be high, the number of time series data of the amount of movement of the subject, which is used to calculate the prediction curve, is smaller than when the image plane speed or acceleration is determined to be low. Reducing the number of time series data reduces the number of data from older periods of low image plane speed or acceleration, which makes it possible to suppress a drop in the accuracy of the predicted position, particularly with respect to subjects for which the speed increases over time.

Figure 18B:
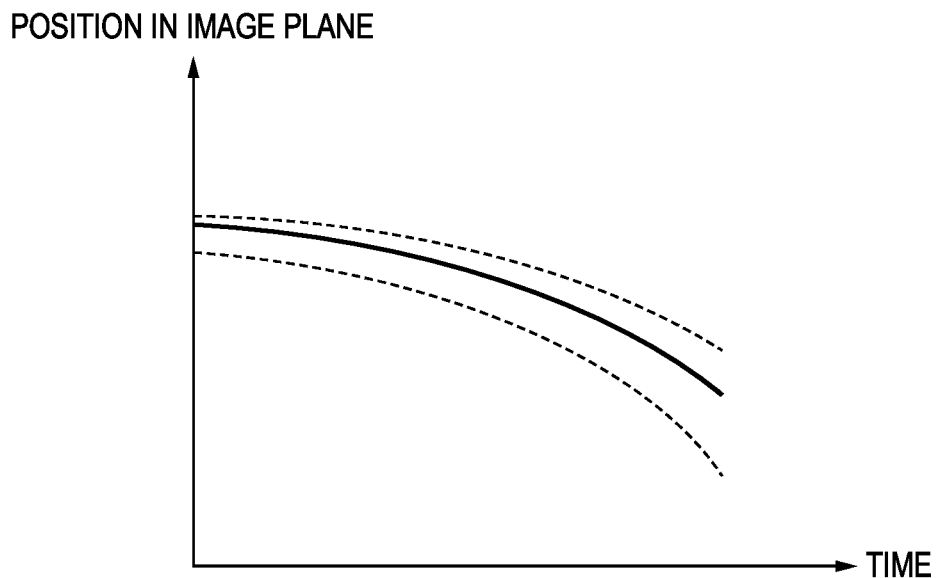

In step S6004, the CPU 121 sets a range over which focus movement is possible. The range over which focus movement is possible will be described with reference to FIG. 18B. In FIG. 18B, the horizontal axis represents time, the vertical axis represents a position of the subject on the image plane, the solid line represents a focus position, and the dotted line represents the range over which focus movement is possible.

When the subject is a moving object, the subject can leave the set focus detection area with ease. If focus control is performed in a state where the subject has left the focus detection area, the focal length can vary greatly. Accordingly, when the subject comes back to the focus detection area, it takes a long time for the subject to come into focus. Therefore, the CPU 121 estimates a range of distance over which the subject moves based on the image plane movement speed of the subject, the subject distance, and the like, and limits the range over which focus movement is possible (a permissible range for change in the focal length).

Then, the CPU 121 does not drive the focus lens when the predicted image plane position (distance) of the subject has changed from the current focal length beyond the permissible range. This makes it possible to suppress situations where the subject suddenly becomes blurry, even when the subject has unintentionally left the focus detection area.

In step S6005, the CPU 121 calculates the predicted position (the distance) of the subject. For example, the CPU 121 can predict the image plane position of the subject by obtaining an equation for a prediction curve through multivariate analysis (e.g., the least squares method) using time series data of past image plane positions and times, and substituting the time when a still image is shot into the equation for the prediction curve.

In step S6006, the CPU 121 changes a focus movement speed. The CPU 121 sets the image plane movement speed of the focus according to the image plane movement speed of the subject estimated based on the image plane position of the subject, predicted in step S6005, and the time series data of past image plane positions. In the example in FIG. 18A, the image plane movement speed of the subject is estimated to be increasing as time passes, and thus the CPU 121 increases the image plane movement speed of the focus.

In step S6007, the CPU 121 determines whether the image plane position (the distance) of the subject predicted in step S6005 is within the range over which focus movement is possible set in step S6004. The CPU 121 executes step S6008 if the predicted image plane position of the subject is determined to be within the range over which focus movement is possible, and ends the predictive AF processing without driving the focus lens if not.

In step S6008, the CPU 121 drives the focus lens 105 to bring the position predicted in step S6005 into focus, and ends the predictive AF processing.

Note that step S6008 may be executed when the predicted image plane position of the subject is not determined to be in the range over which focus movement is possible for a predetermined number of consecutive times (or a predetermined length of time). In this case, the CPU 121 resets the time series data pertaining to the image plane position of the subject, and generates new time series data.

As described thus far, according to the present embodiment, when the subject area cannot be detected, the focus detection area is enlarged based on past data pertaining to the distance between the subject area and the focus detection area. Accordingly, when, for example, a photographer is shooting a moving subject while framing the shot with the camera, a focus detection area can be set having a size appropriate to the photographer's framing skill. This makes it possible to increase the likelihood of performing focus control on the intended subject even when the photographer's framing skill is low, while reducing the risk of focusing on unintended subjects as a result of unnecessarily enlarging the focus detection area.

Second Embodiment

A second embodiment will be described next. The present embodiment is the same as the first embodiment aside from operation for setting the focus detection area. Accordingly, only the operational steps for setting the focus detection area in the present embodiment will be described below. Note that the present embodiment is also assumed to be implemented using the camera 100.

Figure 19:
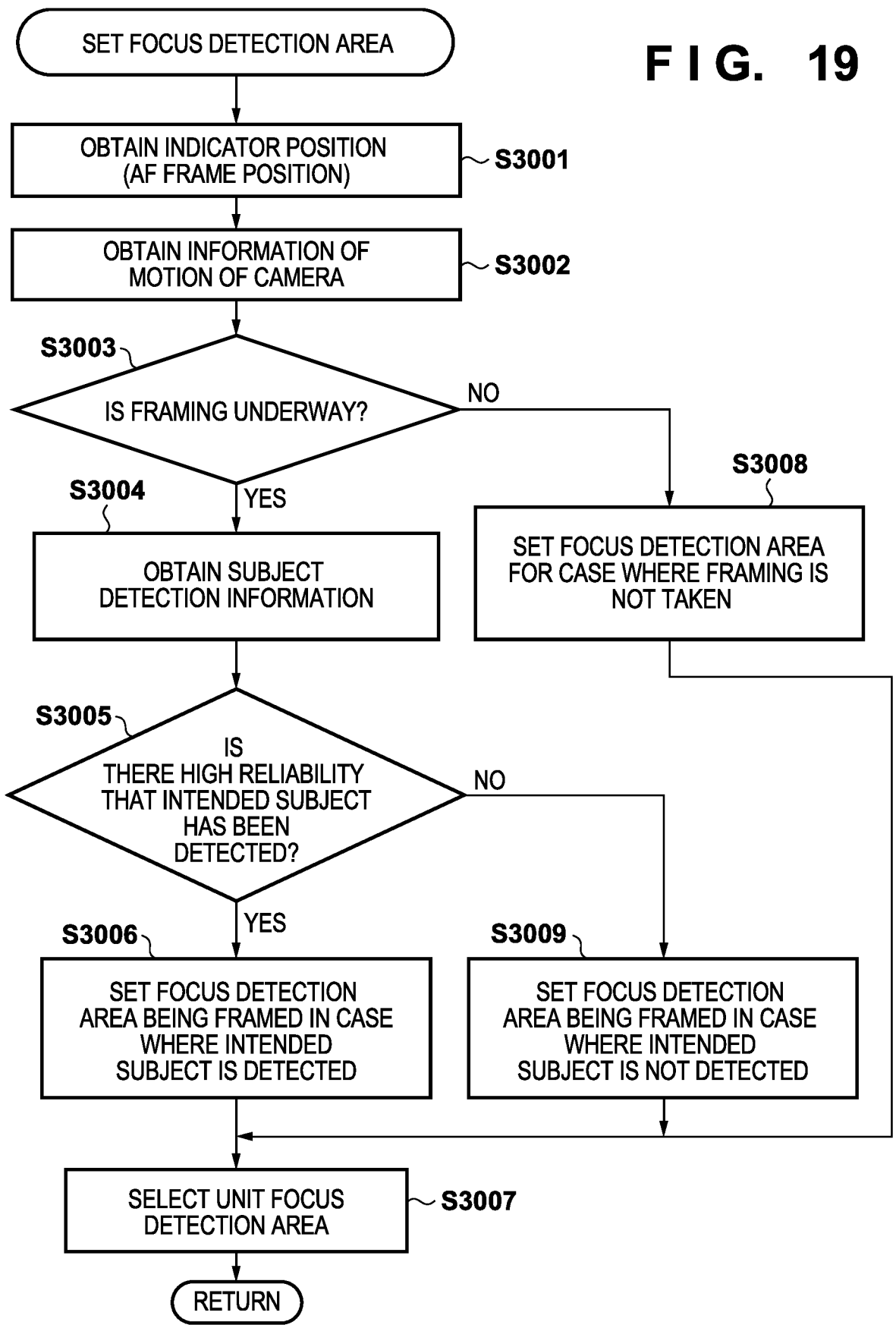
FIG. 19 is a flowchart illustrating processing for setting a focus detection area according to a second embodiment.

FIG. 19 is a flowchart pertaining to operational steps for setting the focus detection area, executed by the CPU 121 in the present embodiment.

In step S3001, the CPU 121 obtains image coordinates of the indicator (the AF frame) of the unit focus detection area set by the user. As described in the first embodiment, the image coordinates of the unit focus detection area may be used instead of the indicator.

In step S3002, the CPU 121 obtains information pertaining to motion of the camera 100 from the output of the motion detection unit 142.

In step S3003, the CPU 121 determines whether a framing action is being taken using the camera 100, based on the motion of the camera 100 detected in step S3002. The CPU 121 executes step S3004 if it is determined that a framing action is being taken using the camera 100, and executes step S3008 if not. The determination as to whether motion of the camera 100 indicates a framing action can be made through a publicly-known method and will therefore not be described in detail here. If it is determined that a framing action is being taken, the CPU 121 also obtains the direction and amount of the framing (e.g., the amount of movement in the image coordinate system between frames).

In step S3008, a framing action is not being taken with the camera 100, and thus the CPU 121 determines that the photographer can easily aim at the subject intended by the indicator currently set. As a result, the CPU 121 sets the unit focus detection area corresponding to the indicator currently set as the final focus detection area, and ends the setting processing. Note that step S3007 is executed when there are a plurality of unit focus detection areas corresponding to the indicator currently set.

In step S3004, the CPU 121 obtains, from the RAM 136, the result of the subject detection/tracking processing performed in step S302 of FIG. 9 (subject detection information). The subject detection information may be, for example, the position (e.g., center of gravity coordinates), the size, motion, the detection reliability, and the like of the subject area, for example.

In step S3005, the CPU 121 determines a reliability that the subject area for which the information was obtained in step S3004 is the subject intended by the photographer. This determination can be made in a similar manner as the determination in step S4002 in the first embodiment. Then, the CPU 121 executes step S3006 if it is determined there is a high reliability that the subject intended by the photographer is detected, and executes step S3009 if not.

In step S3006, the CPU 121 sets the focus detection area for when the intended subject is detected and a framing action is being performed. The CPU 121 enlarges the focus detection area in at least the framing direction, and in a manner that unit focus detection areas overlapping with the subject area are included. If the framing direction is the horizontal direction, the CPU 121 can enlarge the focus detection area in both the right direction and the left direction.

Additionally, in step S3006, the CPU 121 can correct the size of the enlarged focus detection area according to the motion of the camera 100. For example, the CPU 121 corrects the focus detection area to be enlarged even more, or maintains the enlargement, in the direction in which a subject area is determined to have a high reliability as the subject intended by the photographer in step S3005. On the other hand, the CPU 121 corrects the enlargement rate of the focus detection area in other directions to be relatively lower, or does not perform the enlargement.

As described earlier, simply enlarging the focus detection area increases the possibility that the focus detection area will include the background, unintended subjects, or the like. Accordingly, the focus detection area is not enlarged in the direction where the subject area is not present, or the enlargement amount is smaller than in the direction where the subject area is present.

In step S3009, the CPU 121 enlarges the focus detection area according to the framing direction and the framing amount. When shooting while framing the shot, it is easy for positional shift to arise between the subject and the indicator in the framing direction. For example, in framing in the horizontal direction, it is easy for positional shift to arise between the subject and the indicator in the horizontal direction. The magnitude of the positional shift is affected by the framing speed or acceleration.

Accordingly, in step S3009, where the information of the subject area cannot be used, the focus detection area is enlarged at least in the framing direction if, based on the motion information of the camera 100, the positional shift between the indicator and the subject is expected to be large. This increases the probability of the subject being included in the focus detection area, and makes it possible to suppress situations where the background is focused on when the indicator is off the subject. The enlargement amount or the enlargement rate can be determined such that the amount is greater when the framing amount is a second amount than when the framing amount is a first amount (where the second amount is greater than the first amount). The enlargement amount or the enlargement rate can be determined by storing a function or a table that associates framing amounts with enlargement amounts or enlargement rates in the ROM 135 in advance, and using an enlargement amount or an enlargement rate according to the framing amount. Note that the enlarging of the focus detection area may be skipped when the framing amount is less than or equal to a threshold.

Step S3009 is executed when a subject area having a detection reliability that is at least a threshold is not detected, or is not present near the indicator. In such a case, enlarging the focus detection area in at least the framing direction increases the likelihood of the subject being included in the focus detection area.

In step S3007, the CPU 121 selects an appropriate unit focus detection area from the focus detection area set in step S3006, step S3008, or step S3009. For example, the CPU 121 selects the unit focus detection area corresponding to the closest distance in the defocus map corresponding to the focus detection area. Alternatively, the CPU 121 selects the unit focus detection area closest to the center of the shooting range within the focus detection area. This is because the subject at the closest distance among the subjects included in the focus detection area, the subject closest to the center of the shooting range, or the like is highly likely to be the subject intended by the photographer. Note that the unit focus detection area may be selected through another method.

In this manner, the size of the focus detection area is controlled according to whether it is highly likely that the area of the subject intended by the photographer is detected, and whether framing is underway. Accordingly, the focus detection area can be set to an appropriate size according to the situation of the subject, the photographer's framing skill, and the like, which makes it possible to increase the likelihood that focus control will be performed appropriately, even if the indicator is off the intended subject, the intended subject cannot be detected, or the like.

Specific examples of setting the focus detection area in the present embodiment will be described next with reference to FIGS. 20A to 27B.

Figure 20A:
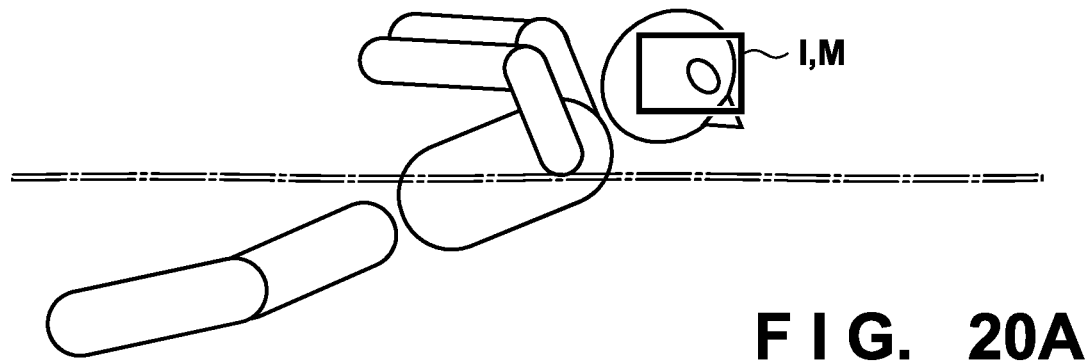
FIGS. 20A to 20C are diagrams illustrating examples of framing by a skilled photographer.
Figure 20B:
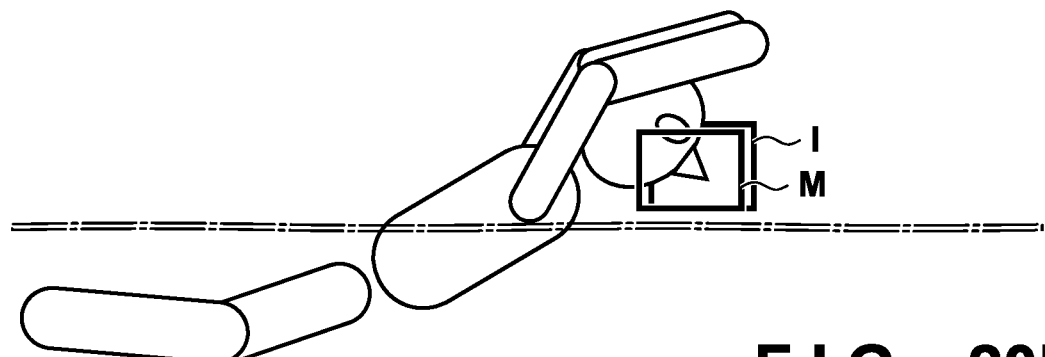
Figure 20C:
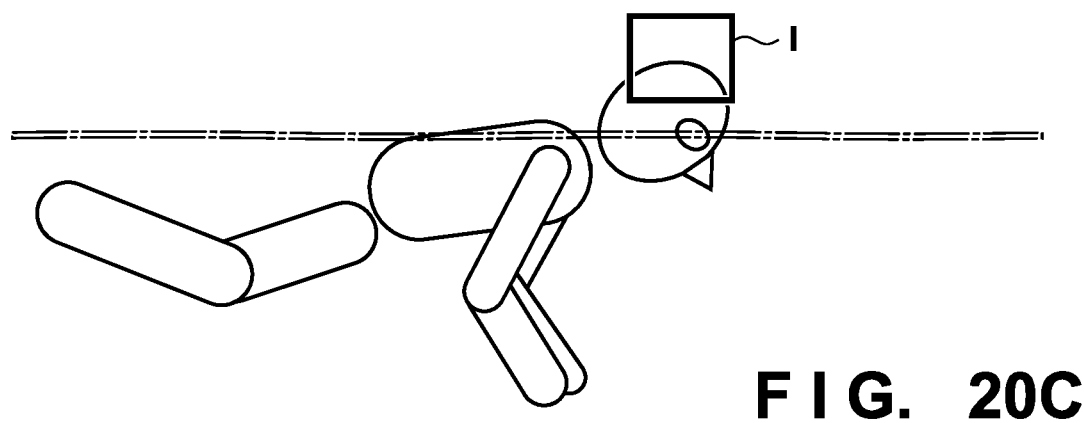

FIGS. 20A to 20C schematically illustrate a scene in which a human subject swimming the butterfly moves in the horizontal direction from left to right, while the user sets one unit focus detection area in which the indicator I is displayed and performs framing with the camera 100 so that the subject is positioned in the indicator I.

FIGS. 20A to 20C illustrate examples of framing by a skilled photographer. In FIGS. 20A and 20B, the detected subject area M and the indicator I substantially coincide. Even in the situation in FIG. 20C, where the face is below the water and the subject area M is not detected, the indicator I is positioned on the head of the subject. When framing is performed as illustrated in FIGS. 20A to 20C, it is highly likely that the focus will be controlled appropriately even without enlarging the focus detection area.

Figure 21A:
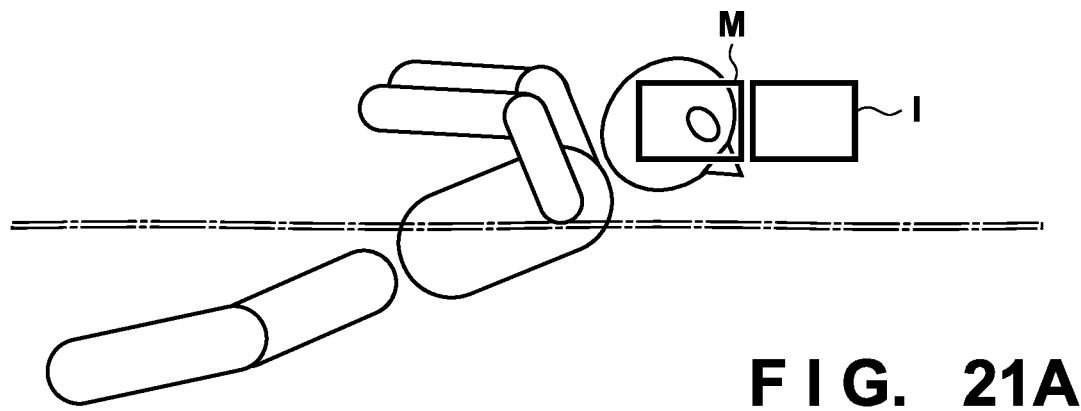
FIGS. 21A to 21C are diagrams illustrating examples of framing by a unskilled photographer.
Figure 21B:
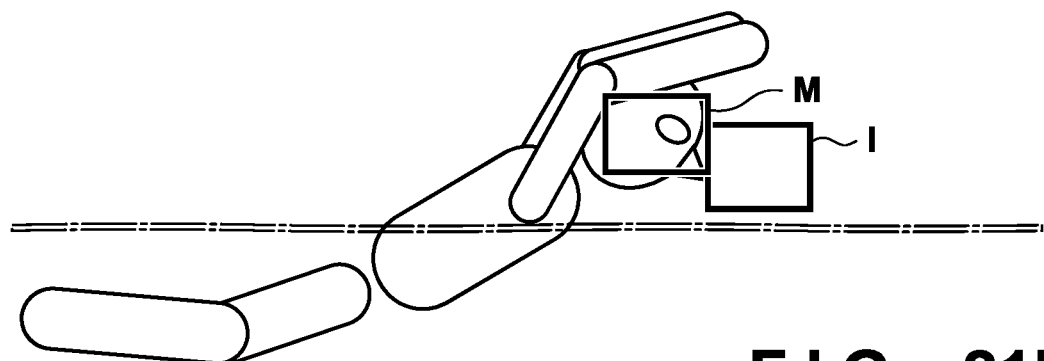
Figure 21C:
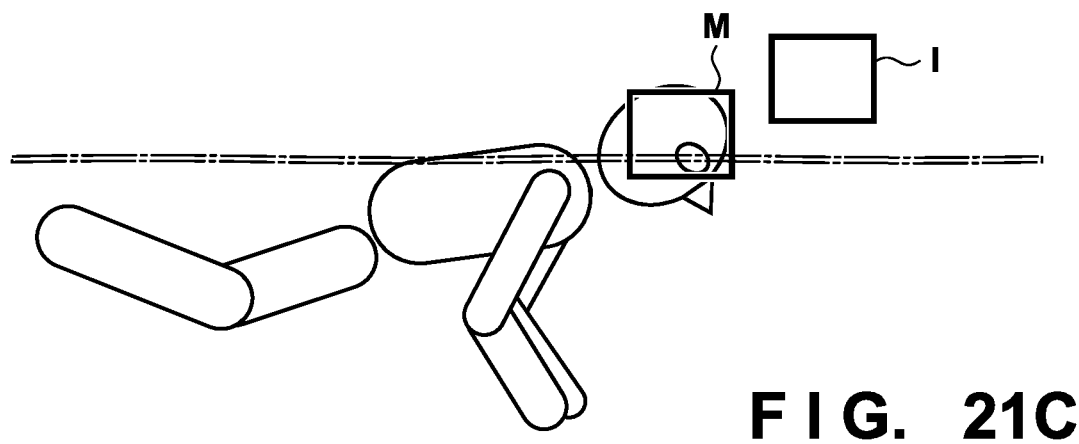

On the other hand, FIGS. 21A to 21C illustrate framing in the same scene as in FIGS. 20A to 20C, but with the indicator I and the subject area M shifted from each other. This is likely to occur when the photographer's framing skill is low, when the speed at which the subject is moving is not constant, or the like.

Figure 22A:
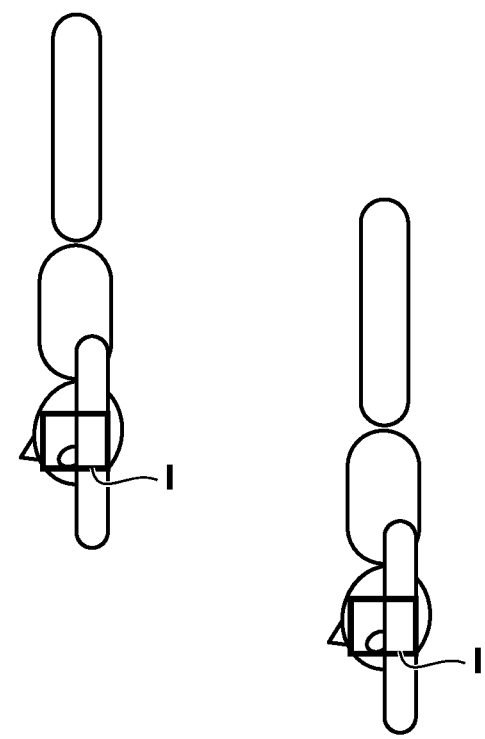
FIGS. 22A and 22B are diagrams illustrating different examples of scenes to be shot according to the second embodiment.
Figure 22B:
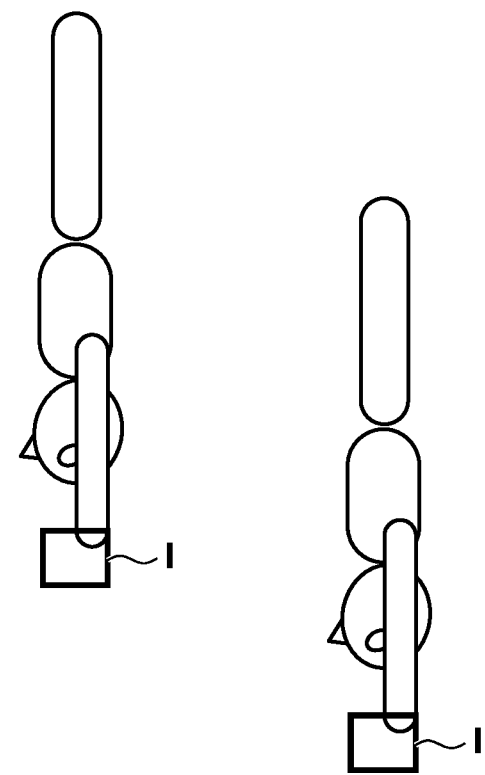

FIGS. 22A and 22B schematically illustrate a scene in which a subject performing a dive in a competition moves in the vertical direction from top to bottom, while the user sets one unit focus detection area in which the indicator I is displayed and performs framing with the camera 100 so that the subject is positioned in the indicator I.

FIG. 22A illustrates an example of framing by a skilled photographer. Meanwhile, FIG. 22B illustrates framing in the same scene as in FIG. 22A, but with the indicator I and the subject area M shifted from each other. Note that in FIGS. 22A and 22B, the face is partially hidden behind the arm and the subject area is therefore not detected.

Shift between the indicator I and the subject area M (or the intended part) is affected by the direction and speed of the framing, as well as the speed at which the subject is moving and the acceleration. For example, when the framing is in the horizontal direction, shift in the horizontal direction will increase. Additionally, when the subject is moving fast and the framing is also fast, the shift will increase. The framing is more difficult when the acceleration of the subject is greater, which ultimately increases the shift.

FIGS. 23A to 24B illustrate examples of setting the focus detection area in step S3009, in the same scene as that illustrated in FIGS. 20A to 21C. The area of the intended subject has not been detected, and the focus detection area is therefore set based on the information on the motion of the camera 100 (the framing).

Here, the focus detection area 1001 is set having been enlarged in the horizontal direction (both the left and right directions) centered on the indicator I, as a result of framing in the horizontal direction being detected. A greater framing amount is detected in FIGS. 23A and 23B than in FIGS. 24A and 24B, and thus the enlargement amount or the enlargement rate is greater than in FIGS. 24A and 24B. Specifically, two unit focus detection areas A each are added on the left and right in FIGS. 23A and 23B, and the focus detection area 1001 including five unit focus detection areas A is set. Meanwhile, one unit focus detection area A each is added on the left and right in FIGS. 24A and 24B, and the focus detection area 1001 including three unit focus detection areas A is set.

FIGS. 25A to 26B illustrate examples of setting the focus detection area in step S3006, in the same scene as that illustrated in FIGS. 20A to 21C. The area of the intended subject is detected, and thus the focus detection area is enlarged based on the information on the motion of the camera 100 (the framing), after which the size of the focus detection area is corrected according to the positional relationship between the indicator I and the subject area M.

First, the focus detection area 1001 is temporarily set having been enlarged by the same amount in the horizontal direction (both the left and right directions) centered on the indicator I, as a result of framing in the horizontal direction being detected. The enlargement amount or the enlargement rate is set such that at least one unit focus detection area A overlapping the subject area M is included. In the example in FIGS. 25A and 25B, the distance between the indicator I and the subject area M is greater than in the example in FIGS. 26A and 26B, and thus the amount by which the focus detection area is enlarged in the left-right direction is greater than in the example in FIGS. 26A and 26B.

Thereafter, the enlargement rate or the enlargement amount is corrected to be reduced in the direction, among the two opposing enlargement directions centered on the indicator I, where the subject area M detected as the area of the subject intended by the photographer is not present. FIGS. 25A to 26B illustrate an example in which correction is performed to avoid enlargement in the direction, of the framing direction (the horizontal direction), that is to the right of the indicator I, where the subject area M is not present.

Figure 27A:
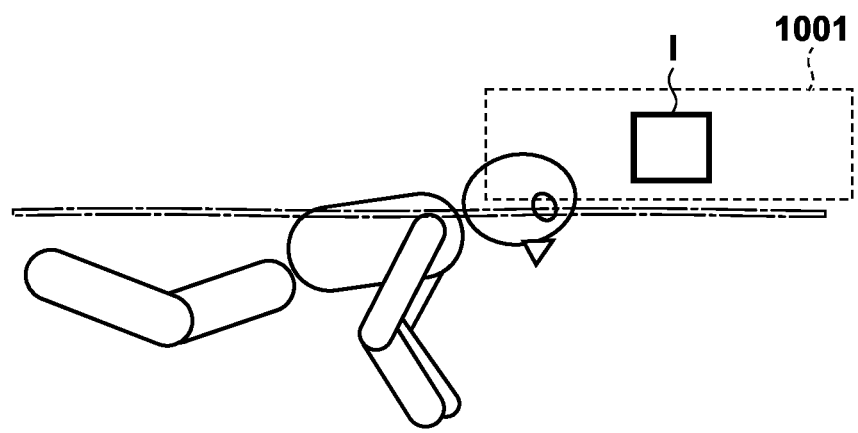
FIGS. 27A and 27B are diagrams illustrating a method for setting a focus detection area according to the second embodiment.
Figure 27B:
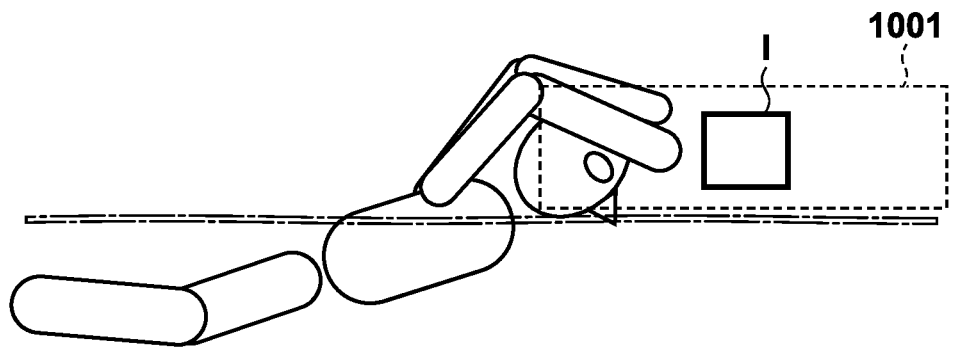

FIGS. 27A and 27B illustrate an example of setting the focus detection area 1001 in a case where the state of the subject changes from the state illustrated in FIGS. 25A and 25B or FIGS. 26A and 26B, and the subject area M is no longer detected. FIG. 27A illustrates a case where the subject's head (face) is hidden under the water, and FIG. 27B illustrates a case where the subject's head (face) is hidden by the hands or water splashing.

Figure 23A:
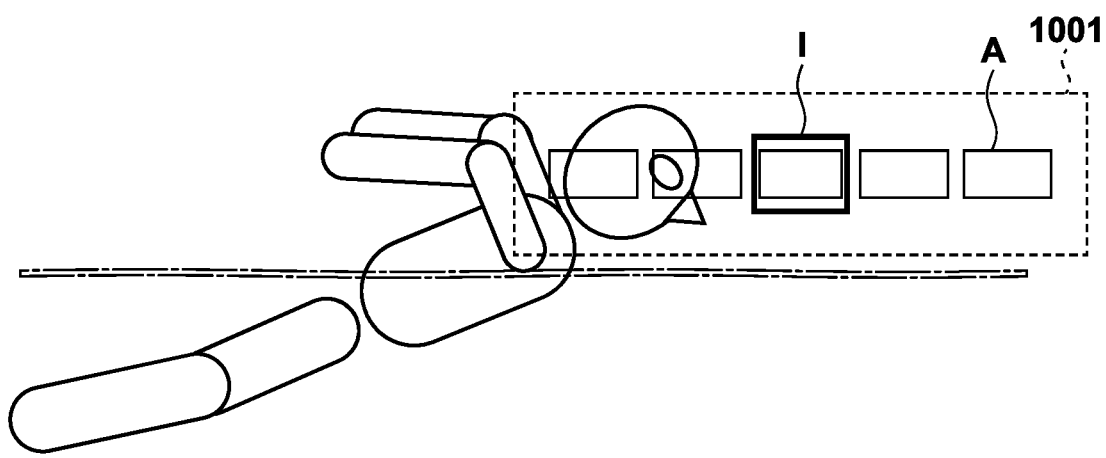
FIGS. 23A and 23B are diagrams illustrating a method for setting a focus detection area according to the second embodiment.
Figure 23B:
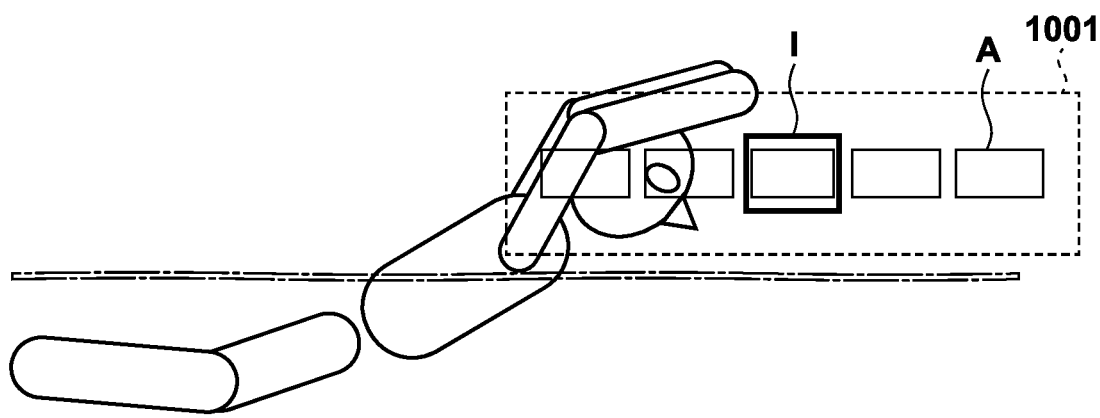
Figure 24A:
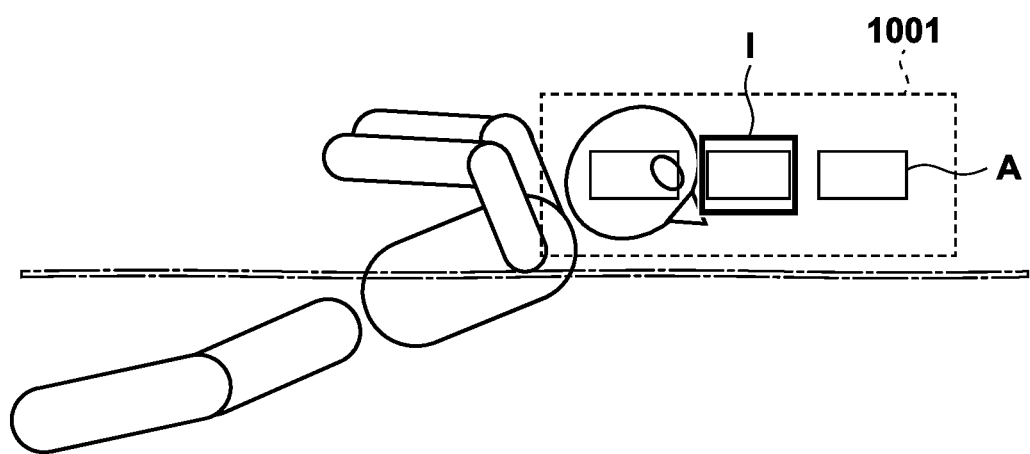
FIGS. 24A and 24B are diagrams illustrating a method for setting a focus detection area according to the second embodiment.
Figure 24B:
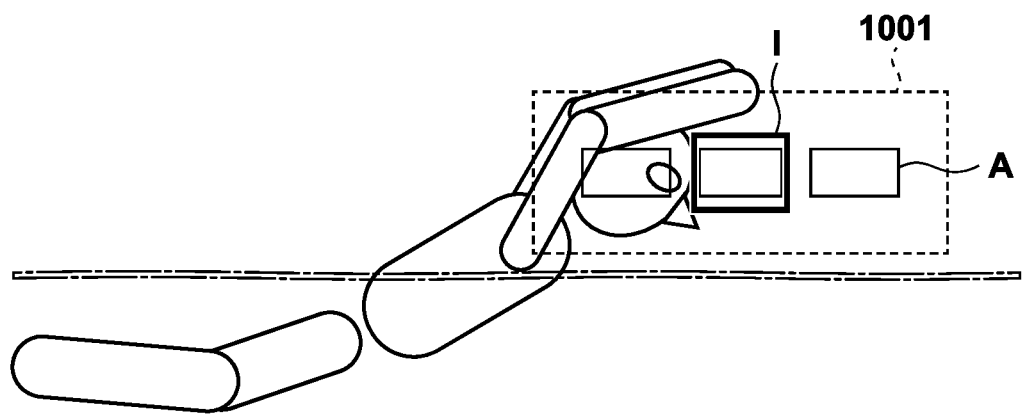
Figure 25A:
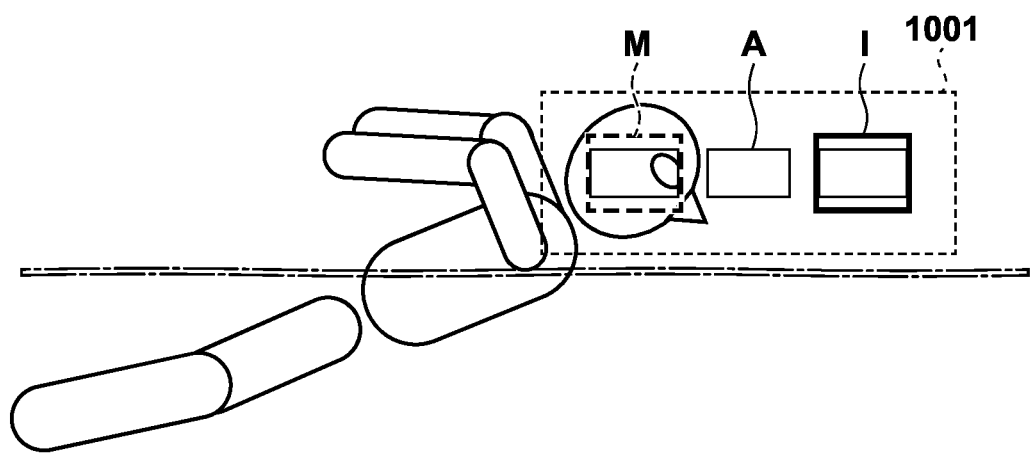
FIGS. 25A and 25B are diagrams illustrating a method for setting a focus detection area according to the second embodiment.
Figure 25B:
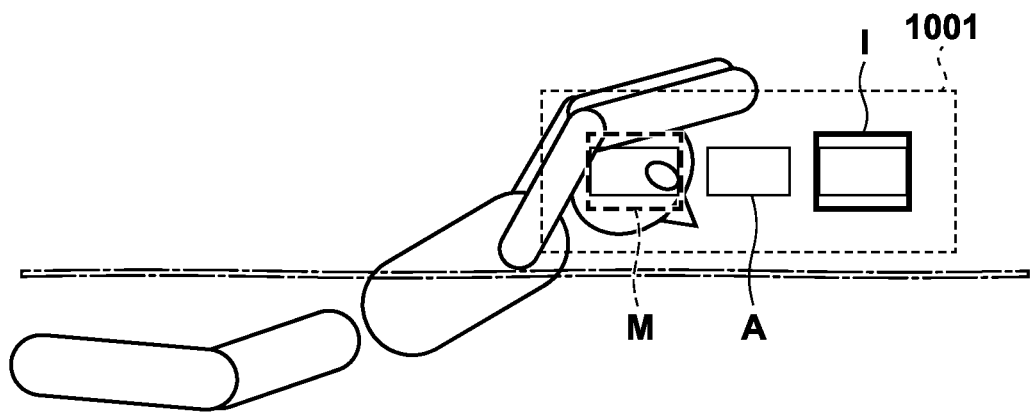
Figure 26A:
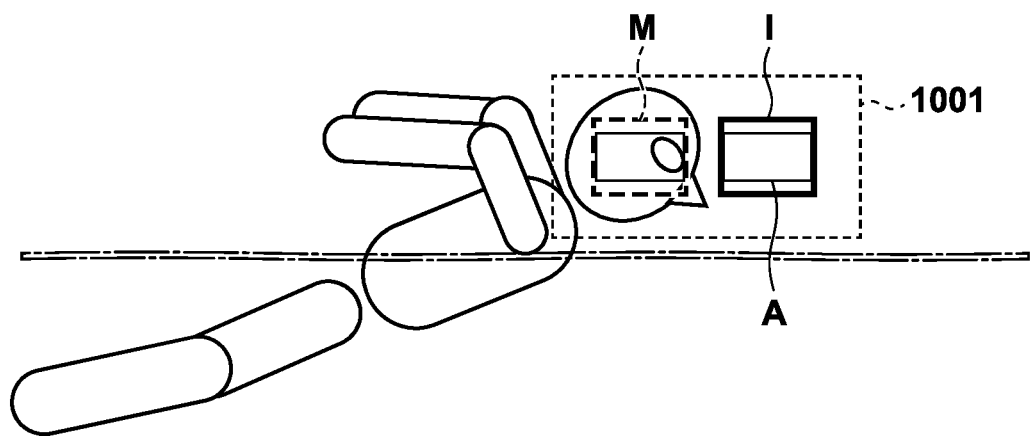
FIGS. 26A and 26B are diagrams illustrating a method for setting a focus detection area according to the second embodiment.
Figure 26B:
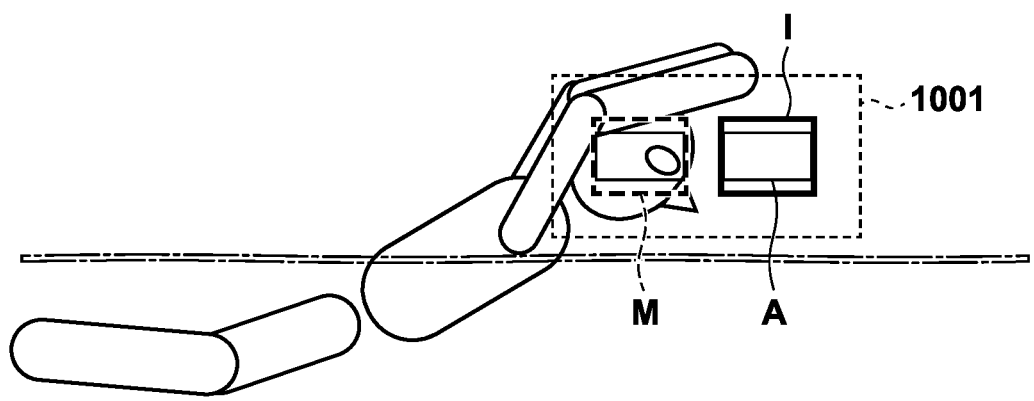

In this case, the CPU 121 switches the method for enlarging the focus detection area based on the information on the motion of the camera 100 (the framing, described with reference to FIGS. 23A and 23B, and sets the focus detection area 1001.

Although examples of setting the focus detection area in a case where the framing direction is the horizontal direction have been described with reference to FIGS. 20A to 27B, the focus detection area can be set in a similar manner when the framing direction is the vertical direction or a diagonal direction.

In the present embodiment, the focus detection area is enlarged according to the framing direction and the framing amount when an area of the subject thought to be intended by the photographer is not detected. Accordingly, the focus detection area is enlarged more when the photographer is unable to predict the subject's motion well and unintentionally increases the framing amount. As such, the likelihood that the subject is included in the focus detection area can be increased, and major changes in the focal state of the subject can be suppressed.

Additionally, when an area of the subject thought to be intended by the photographer is detected, the focus detection area is enlarged to include the area of the subject, and the size of the focus detection area is corrected such that unnecessary enlargement is not performed. Accordingly, the likelihood that the focus will be controlled to the subject intended by the photographer can be increased while suppressing the possibility of the focus being controlled to the background or other subjects.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-015819 filed on Feb. 3, 2022 which is hereby incorporated by reference herein in its entirety.

What is claimed is:

1. An image capture apparatus comprising one or more processors that execute a program stored in a memory and thereby function as:
a detection unit configured to detect a subject area from an image that has been shot;
an obtainment unit configured to obtain a distance in the image between a focus detection area that is set and the subject area detected; and
an enlargement unit configured to enlarge the focus detection area in a case where the subject area is not detected or a reliability that the detected subject area corresponds to an intended subject is determined to be low,
wherein the enlargement unit enlarges the focus detection area based on the distances previously obtained by the obtainment unit.

2. The image capture apparatus according to claim 1, wherein the enlargement unit enlarges the focus detection area based on a variance in the distances.

3. The image capture apparatus according to claim 2, wherein the focus detection area is enlarged based on a magnitude that is a predetermined multiple of a magnitude of the variance in the distances.

4. The image capture apparatus according to claim 1, wherein the enlargement unit enlarges the focus detection area based on a representative value of the distances.

5. The image capture apparatus according to claim 4, wherein the enlargement unit enlarges the focus detection area more in a case where the representative value of the distances is a second value than in a case where the representative value of the distances is a first value, the second value being greater than the first value.

6. The image capture apparatus according to claim 4, wherein the enlargement unit enlarges the focus detection area based on a representative value of the distances and a framing amount of the image capture apparatus.

7. The image capture apparatus according to claim 1, wherein the enlargement unit enlarges the focus detection area more in a forward direction of a direction of movement of a subject.

8. The image capture apparatus according to claim 1, wherein the image capture apparatus is capable of setting a plurality of unit focus detection areas, and the enlargement unit enlarges the focus detection area so as to include two or more of the plurality of the unit focus detection areas.

9. A control method executed by an image capture apparatus, the control method comprising:
detecting a subject area from an image that has been shot;
obtaining a distance between a focus detection area that is set and the subject area detected; and
enlarging the focus detection area in a case where the subject area is not detected or a reliability that the detected subject area corresponds to an intended subject is determined to be low,
wherein in the enlarging, the focus detection area is enlarged based on the distances previously obtained.

10. A non-transitory machine-readable medium that stores a program for causing a computer of an image capture apparatus to function as:
a detection unit configured to detect a subject area from an image that has been shot;
an obtainment unit configured to obtain a distance in the image between a focus detection area that is set and the subject area detected; and
an enlargement unit configured to enlarge the focus detection area in a case where the subject area is not detected or a reliability that the detected subject area corresponds to an intended subject is determined to be low,
wherein the enlargement unit enlarges the focus detection area based on the distances previously obtained by the obtainment unit.

* * * * *